Nov. 22, 1960  A. S. DOROSZ  2,960,703
SHOEMAKING SYSTEMS FOR THE AUTOMATIC MANUFACTURE OF SHOES
Filed Aug. 31, 1956  13 Sheets-Sheet 1

Inventor
Adolph S. Dorosz
By his Attorney

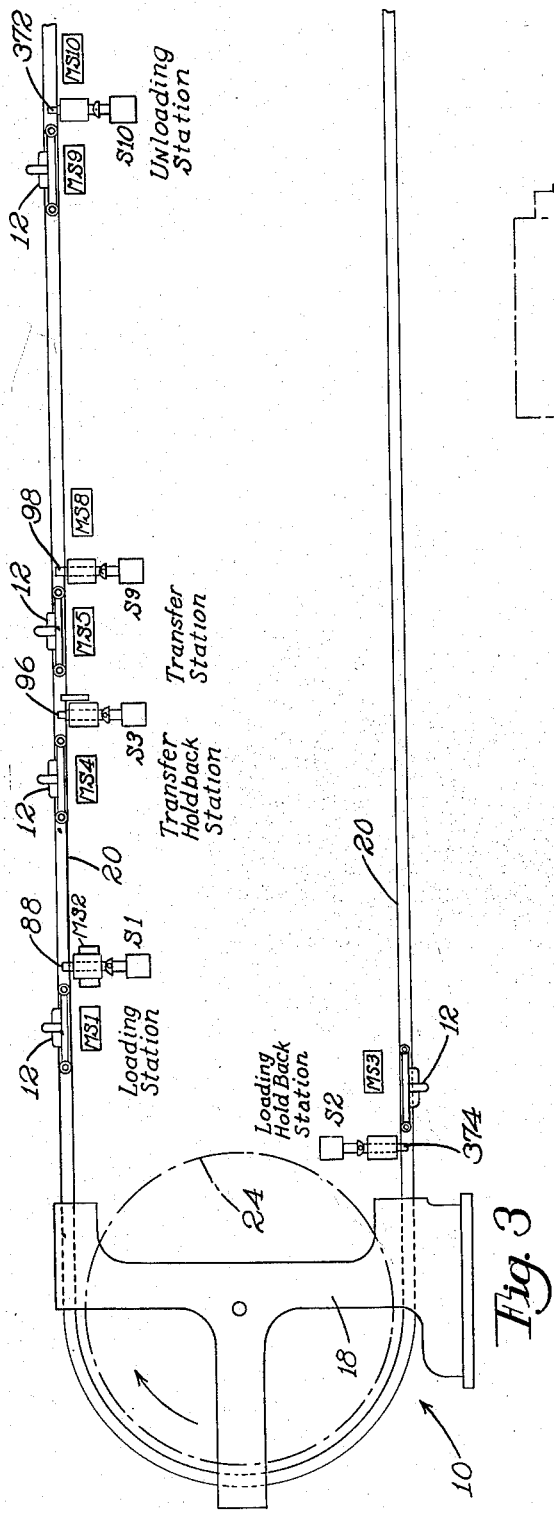

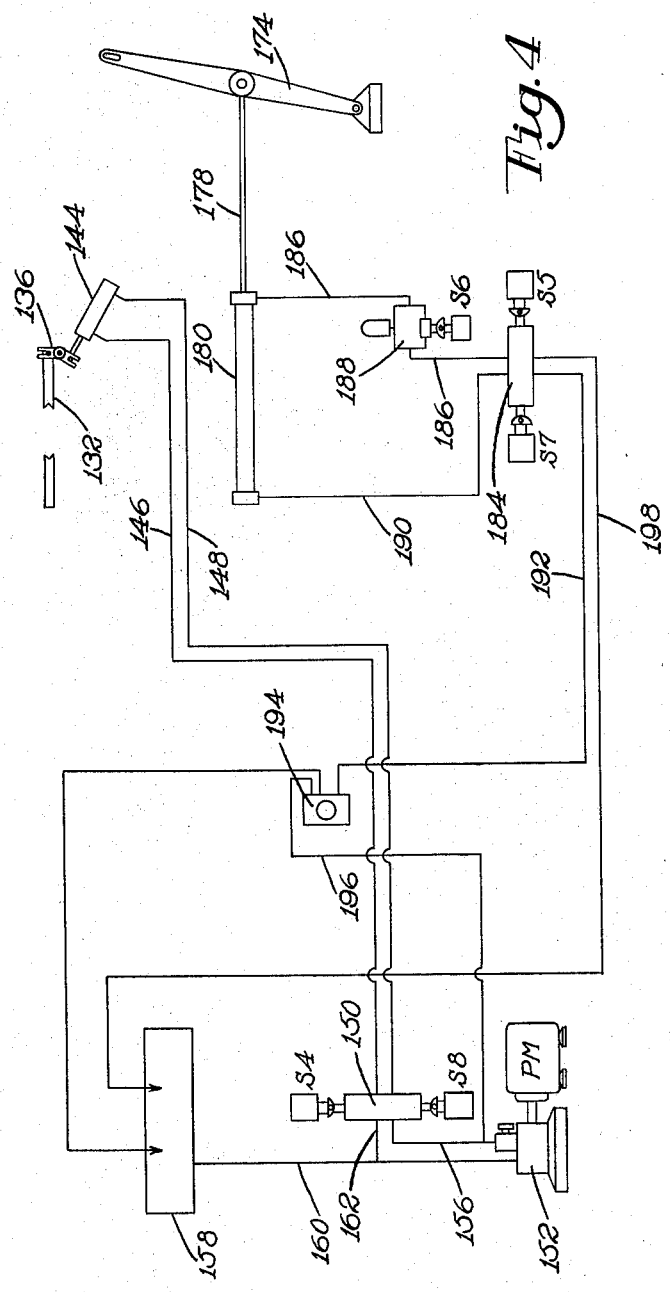

Nov. 22, 1960 — A. S. DOROSZ — 2,960,703
SHOEMAKING SYSTEMS FOR THE AUTOMATIC MANUFACTURE OF SHOES
Filed Aug. 31, 1956 — 13 Sheets-Sheet 6

Inventor
Adolph S. Dorosz
By his Attorney

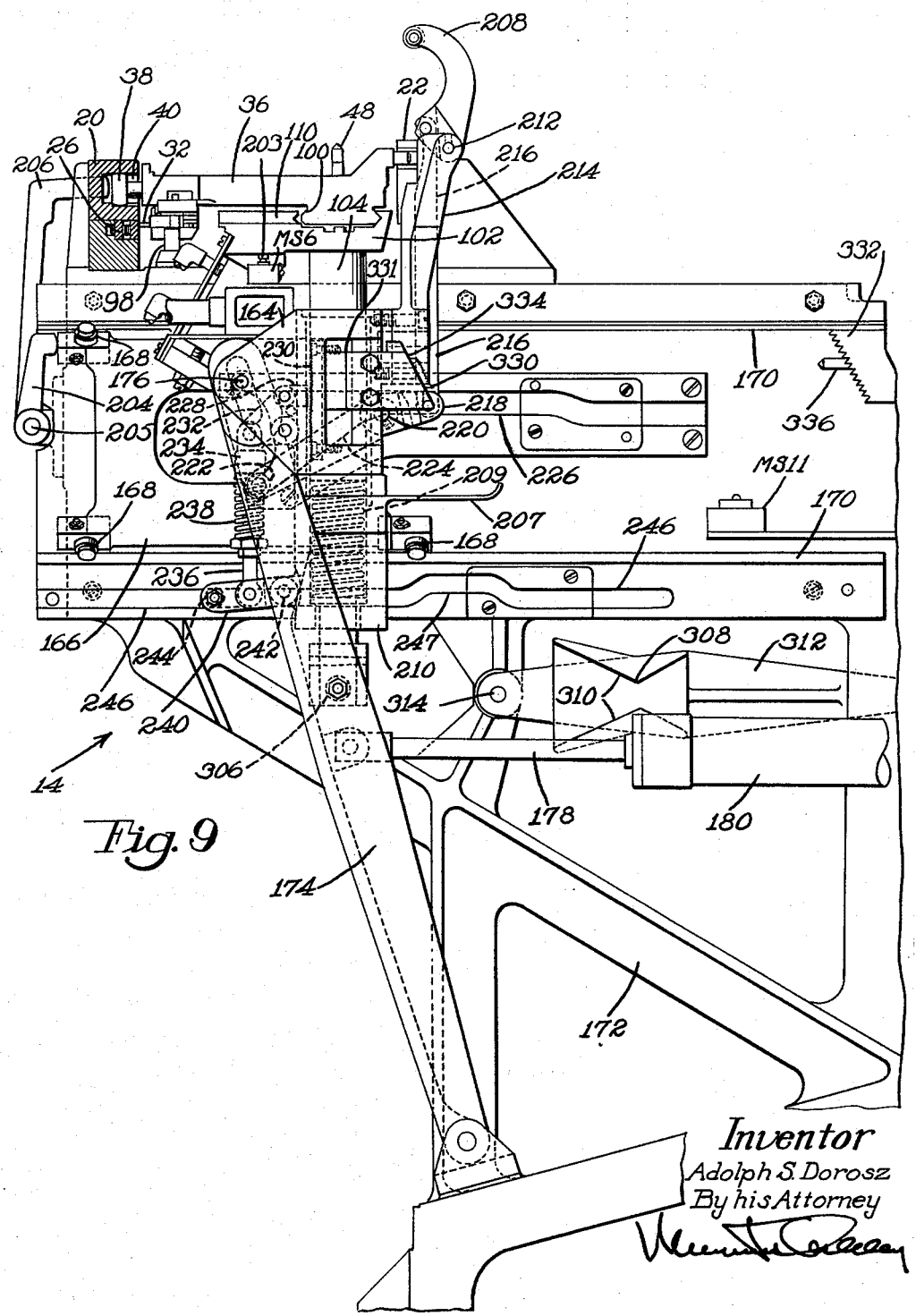

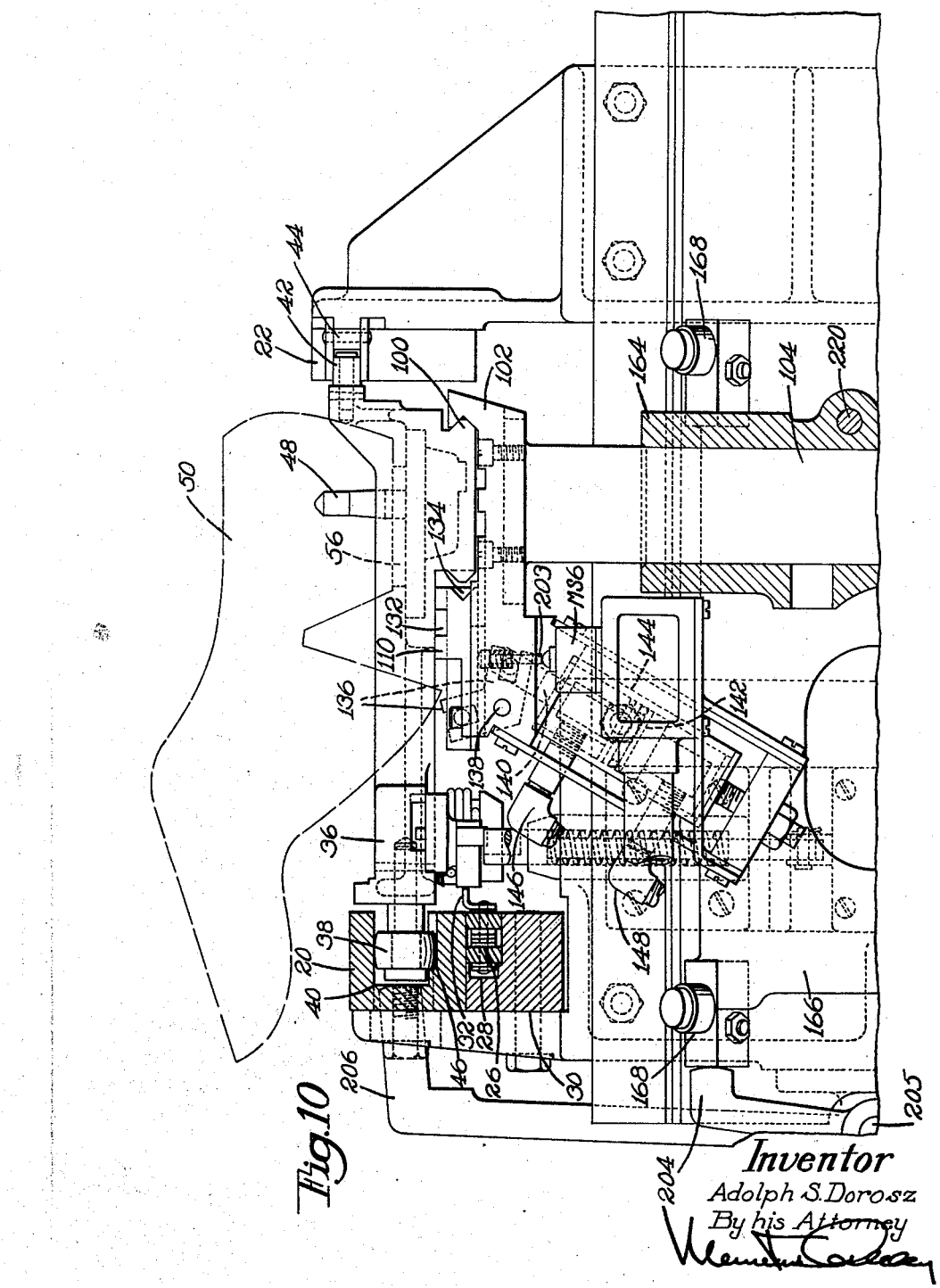

Nov. 22, 1960 — A. S. DOROSZ — 2,960,703
SHOEMAKING SYSTEMS FOR THE AUTOMATIC MANUFACTURE OF SHOES
Filed Aug. 31, 1956 — 13 Sheets-Sheet 9
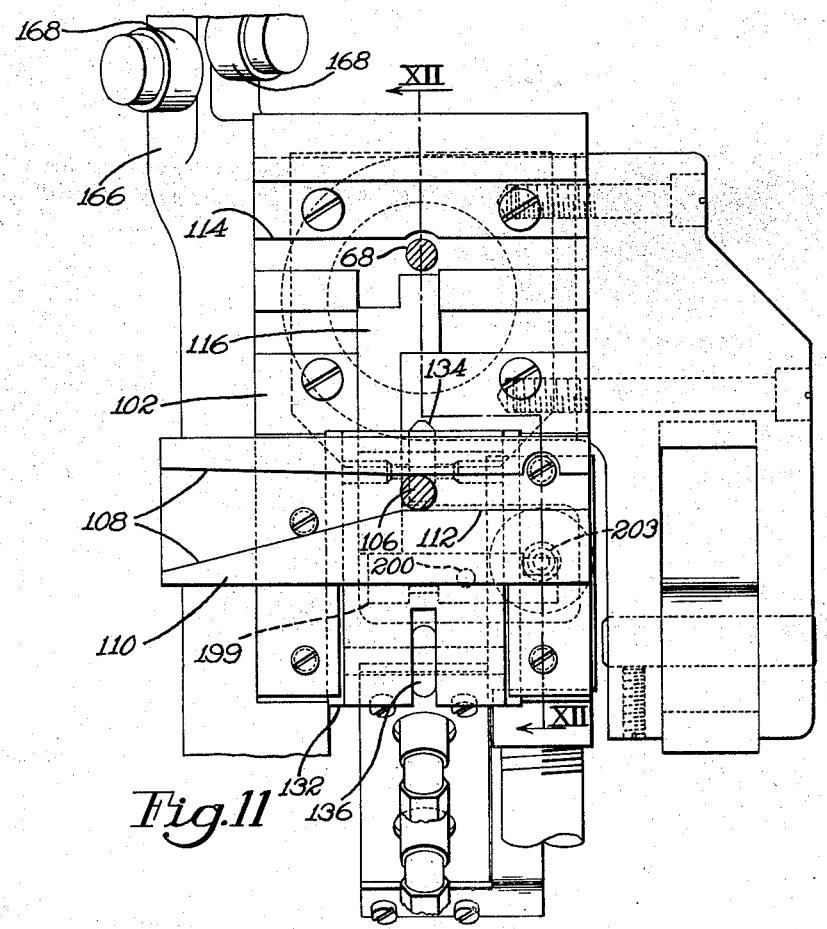
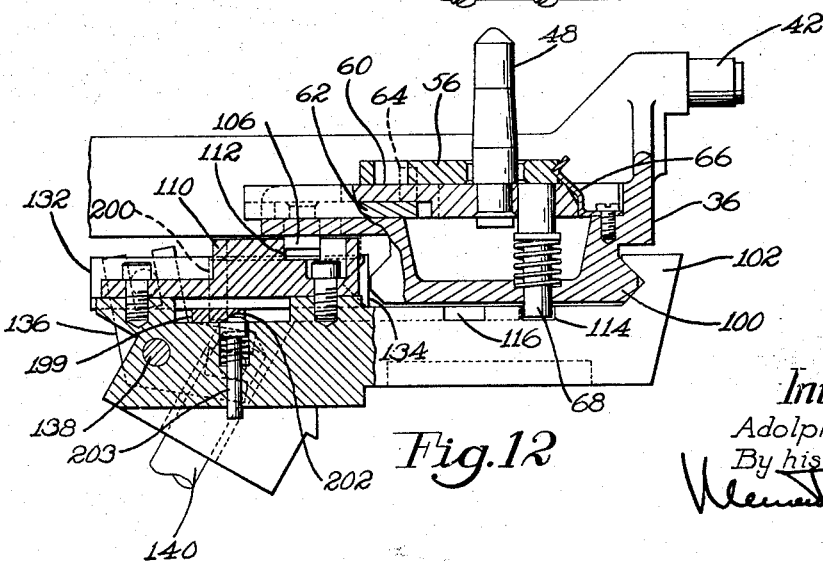
Inventor
Adolph S. Dorosz
By his Attorney

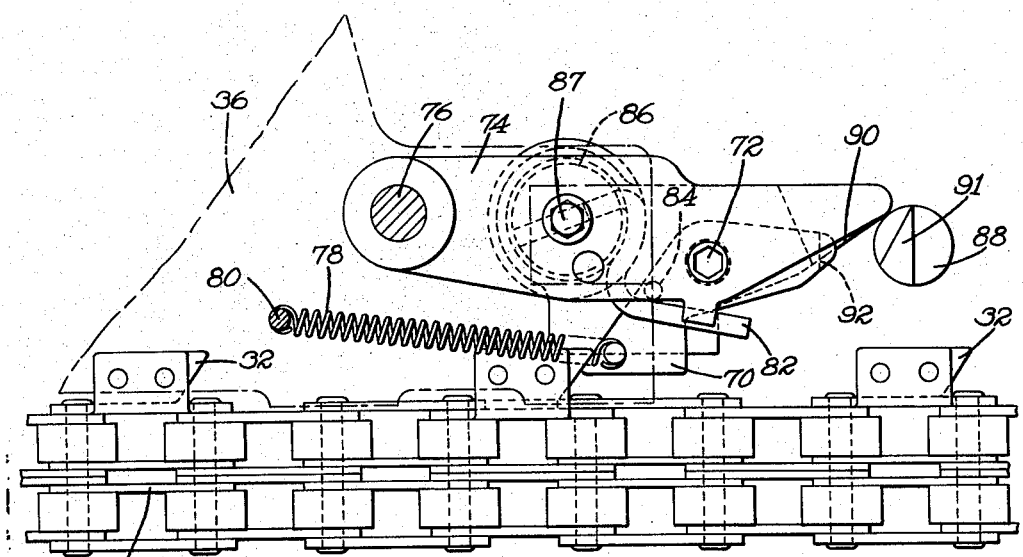
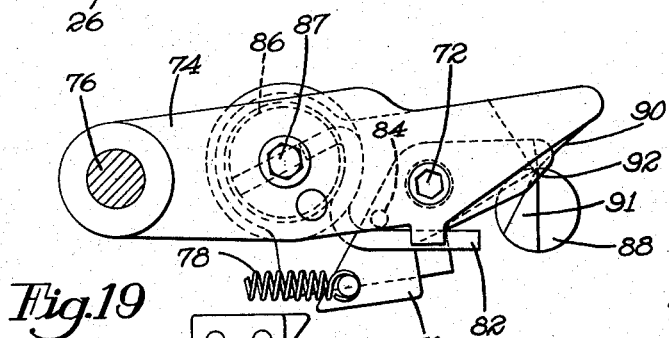
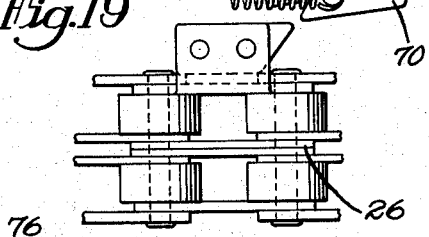
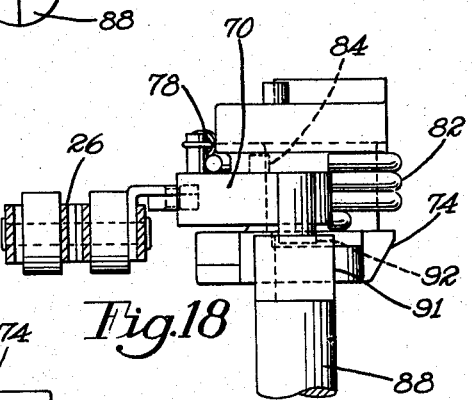
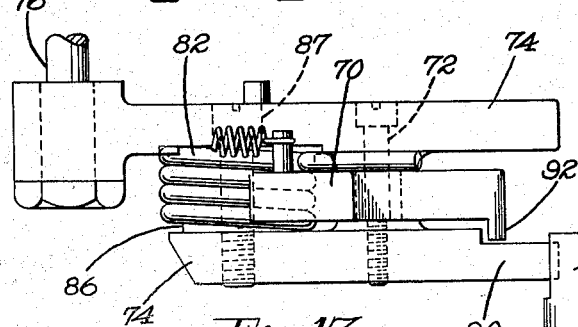

Inventor
Adolph S. Dorosz
By his Attorney

United States Patent Office 2,960,703
Patented Nov. 22, 1960

2,960,703

SHOEMAKING SYSTEMS FOR THE AUTOMATIC MANUFACTURE OF SHOES

Adolph S. Dorosz, Beverly, Mass., assignor to United Shoe Machinery Corporation, Boston, Mass., a corporation of New Jersey Filed Aug. 31, 1956, Ser. No. 607,363

80 Claims. (Cl. 12—1)

This invention relates to shoemaking systems, and is illustrated herein as embodied in an improved shoe handling apparatus for carrying shoes to and between different operating stations at one of which, at least, an unattended machine automatically performs an operation upon the shoes.

The expense occasioned by the use of racks for holding shoes in process of manufacture, the time lost in transferring the racks between operating stations, together with the delay in the further processing of the finished shoes upon any rack until the operation upon the last shoe on the rack has been completed, contribute materially to the manufacturing cost. Another cost increasing factor resides in the fact that the operators are periodically diverted from their machines or operating stations by the necessity for disposing of a rack of shoes which have been operated upon and obtaining a new rack of shoes to be operated upon.

Although with the improvement of many shoemaking machines the skill required of the operators has been considerably reduced, the labor expense is still a material element in the cost of the operations, even though the machines involved may have been improved to the point where the operator's principal function is to present shoes to and remove them from the machines.

In view of the foregoing, it is a principal object of the invention to provide a shoemaking system in the use of which the handling of shoes at and between a series of operating stations is minimized.

To this end, and in accordance with one feature of the invention, an unattended shoemaking machine which, once actuated, goes through its operating cycle automatically, is combined with novel shoe handling apparatus for carrying shoes from a loading station to and away from the machine, and thence to and away from one or more additional stations where operations may be performed upon the shoes by operators whose entire time is given to the operation involved because of the automatic supply of the work to, and its delivery from, their stations.

More specifically, the illustrated shoe handling apparatus comprises, with pallets for holding lasts carrying shoes to be operated upon, an endless conveyor or runway along which the pallets are advanced from the loading station to the machine and the other operating stations and finally are returned to the loading station. With a view to auotmatically controlling the flow of pallets along the conveyor, and in accordance with further features of the invention, various control means are provided in the illustrated apparatus for effecting the admission of a pallet to the loading station or to the machine for each pallet which departs therefrom. This control means also includes provision for automatically releasing the leading pallet of a predetermined supply of pallets detained at the loading station for movement away from the loading station in response to the complete loading of a last upon that pallet, the control means being so constructed and arranged as to prevent the succeeding pallet from departing from the loading station until it also will have been loaded.

With a view to facilitating the automatic presentation of shoes in the proper position to a shoemaking machine, as well as the proper performance of the shoemaking operation automatically by the machine, the use of geometrically graded lasts is contemplated in connection with the practice of the present invention. In a series of such lasts, as disclosed in United States Letters Patent No. 1,948,547, granted February 27, 1934, on an application of L. E. Topham, any dimension of lasts of successive sizes varies by a common ratio or gradient and, accordingly, any selected dimension will vary proportionately with any other dimension.

With the foregoing in view, a further object of the invention is to facilitate and improve the performance automatically of shoemaking operations in machines taking advantage of the proportionality of geometrically graded lasts.

To this end, and in accordance with a further feature of the invention, the illustrated shoemaking system is to include with work handling apparatus for presenting shoes on geometrically graded lasts to a machine having operating tools mounted for adjustment along one of the dimensions of the last to accommodate shoes of different sizes, means for registering the size of the shoe with reference to a second dimension of the last, and mechanism controlled by said registering means for adjusting the operating tools according to the size of the shoe presented thereto.

As an example of an automatic shoe machine in which the tools are set, in accordance with the size of the work presented thereto and in the manner referred to above, there is disclosed herein a welt butting and tacking machine with which there is associated work handling apparatus having means for registering the height of the heel part of the last, and other means controlled by the registering means for adjusting the operating tools laterally of the last into such a position that, for any size of work, the projecting welt ends of the work, which are to be trimmed and tacked to the bottom of the shoe, will be presented to the operating tools in the proper relation thereto.

With the use of an unattended shoe machine served by work handling apparatus of the type disclosed herein it is evident that the work must be presented to the machine at a predetermined operative position with uniformity from shoe to shoe. Involved in such positioning of the shoe is the requirement that each operation upon the shoe requires a certain orientation of the shoe relatively to the machine which must be dealt with in respect to the right and left shoes of a pair as well as in respect to whether the operation is performed upon the forepart, the heel end, or some other portion of the shoe.

In view of the foregoing, and in accordance with a further feature of the invention, the work handling apparatus in the illustrated machine is designed to present each pallet with a shoe thereon to the machine along a predetermined path, additional mechanism being provided for properly orienting the last with respect to the pallet before the work is presented to the machine and for holding it in this position.

The last illustrated herein is of the type disclosed in United States Letters Patent No. 2,806,233, granted on September 17, 1957, upon an application of A. R. Hubbard et al., having integral with its heel end at the top thereof a positioning plate on which are formed two sets of positioning surfaces, one of which is related to the axis of the heel part, the other being related to the turning axis of the last or the center line of the forepart. The orienting of this type of last in the illustrated work handling apparatus is effected by means, in which invention is to be recognized, which is operated in response to coupling movement of each pallet onto mechanism for carrying the work from the above-mentioned conveyor into the machine and cooperates with either one or the other of the sets of positioning surfaces on the positioning plate to position the last upon the pallet in the orientation required by the particular machine to which the work is presented.

The above and various other objects and features of the invention will now be described, in the following detailed description of an illustrative shoemaking system embodying the invention, with reference to the accompanying drawings, and will be pointed out in the appended claims.

In the drawings,

Fig. 2 is a diagrammatical plan view illustrating the relation between the conveyor, transfer mechanism and shoe machine and indicating various parts of mechanism for controlling the flow of the work toward and away from the machine;

Fig. 3 is a diagrammatical front elevation of a part of the conveyor and various parts of the control mechanism;

Fig. 4 is a diagrammatical view illustrating the fluid-operated system of the illustrated apparatus;

Fig. 9 is an enlarged side elevation, partly in section, of the conveyor and transfer mechanism as shown in Fig. 1;

Fig. 10 is a sectional side elevation of the conveyor and the upper portion of the transfer mechanism shown in Fig. 9;

Fig. 11 is an enlarged plan view of a portion of the transfer mechanism shown in Fig. 6;

Fig. 12 is a sectional side elevation of a pallet assembled with the structure shown in Fig. 11, the section being taken along the line XII—XII;

Fig. 16 is a plan view illustrating a driving device for a pallet in operative relation to the conveyor chain;

Figs. 17 and 18 are front and side elevations, respectively, of the driving device shown in Fig. 16;

Fig. 19 is a plan view showing the driving device disconnected from the conveyor chain;

Figure 1:
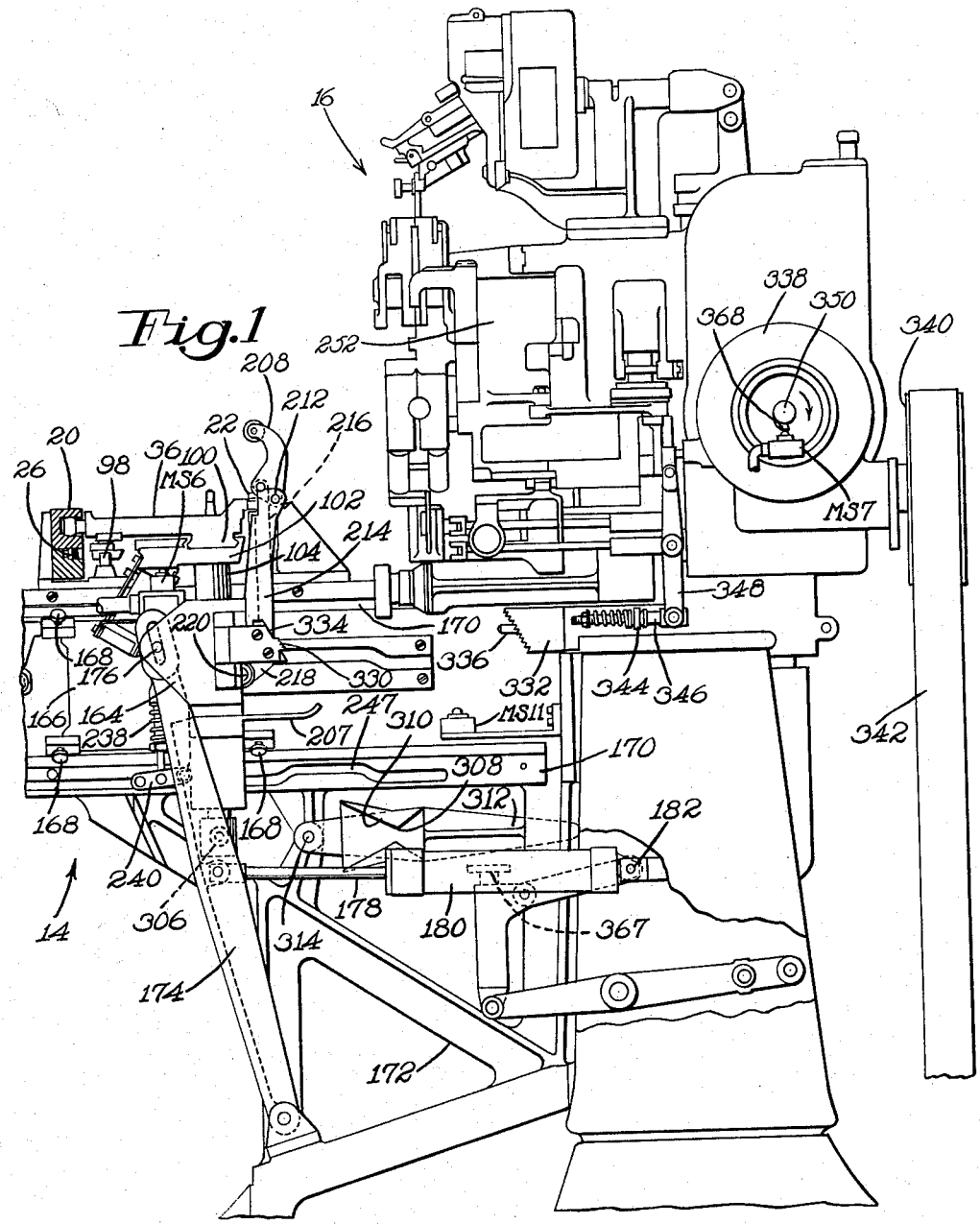
Fig. 1 is a side elevation of a shoe machine, herein illustrated as a welt butting and tacking machine and an illustrative apparatus, comprising a conveyor and transfer mechanism, for automatically presenting to the machine shoes to be operated upon.

The illustrated apparatus comprises an endless conveyor 10 (Figs. 2 and 3) adapted to carry pallets 12 from a loading station to a transfer station from which a transfer mechanism 14 carries the pallets, one at a time, from the conveyor into a shoemaking machine 16 (Fig. 1) (a welt butting and tacking machine being disclosed herein for purposes of illustration) for performing a shoemaking operation upon a lasted shoe carried by the pallet.

The lasted shoe is positioned upon the pallet in a predetermined relation thereto. The pallet, similarly, is assembled upon the transfer mechanism in a predetermined relation thereto; and the transfer mechanism is operable through a path of predetermined direction and of an extent limited by means controlled by the size of the shoe, so that all shoes, whether right or left and regardless of size, are positioned in the same relation with respect to the operating tools of the machine 16.

After a lasted shoe has been placed upon a pallet at the loading station, the shoe is automatically delivered to the transfer mechanism which then presents the shoe to the machine 16, the latter being automatically adjusted in accordance with the size of the shoe and actuated to carry out its cycle of operation. In the case of the welt butting and tacking machine illustrated herein, the welt ends are trimmed at the heel breast line and are tacked to the shoe bottom. At the end of the cycle of operation of the machine 16, the transfer mechanism is automatically actuated to return the pallet carrying the lasted shoe just operated upon to the conveyor which now carries the pallet to the next station. This station, as illustrated herein, is an unloading station but it is to be understood that other operating stations, with which there may be associated automatic shoemaking machines of any type, or at which manual shoemaking operations, such as shank attaching and bottom filling, are performed may be arranged along the conveyor in advance of the unloading station. An operator at the unloading station will remove each lasted shoe from its pallet, and the pallet will proceed automatically to a loading holdback station at the left hand end of the lower run of the conveyor where empty pallets, in excess of a supply maintained at the loading station, collect.

It is to be understood that while the above-described occurrences pertaining to one pallet take place, the operator will have loaded succeeding pallets, so that upon the discharge of each shoe bearing pallet from the transfer station, the succeeding pallet will be automatically presented to the machine 16 and the next succeeding pallet will be automatically advanced to the transfer station.

Figure 5:
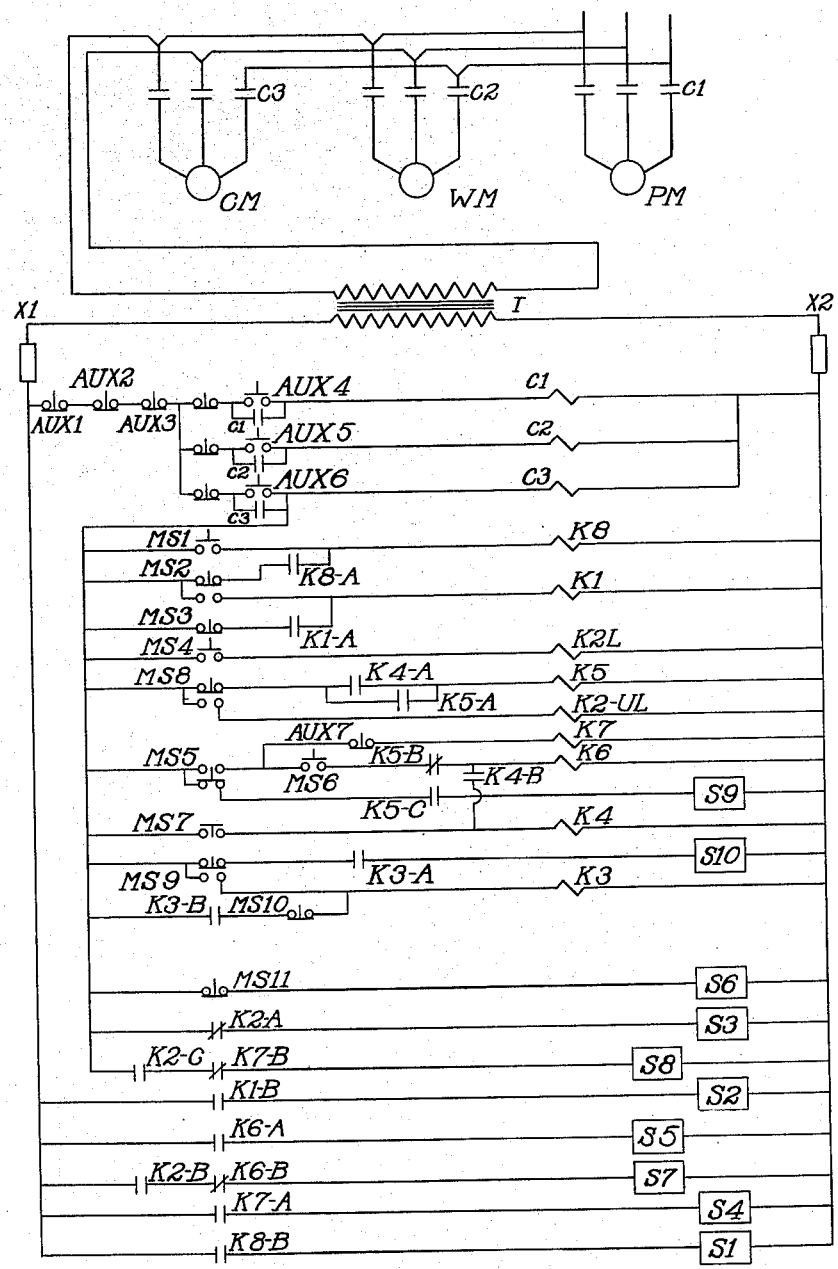
Fig. 5 is a diagram representing the electrical equipment and connections of the driving and controlling mechanism for the illustrated apparatus.
Figure 6:
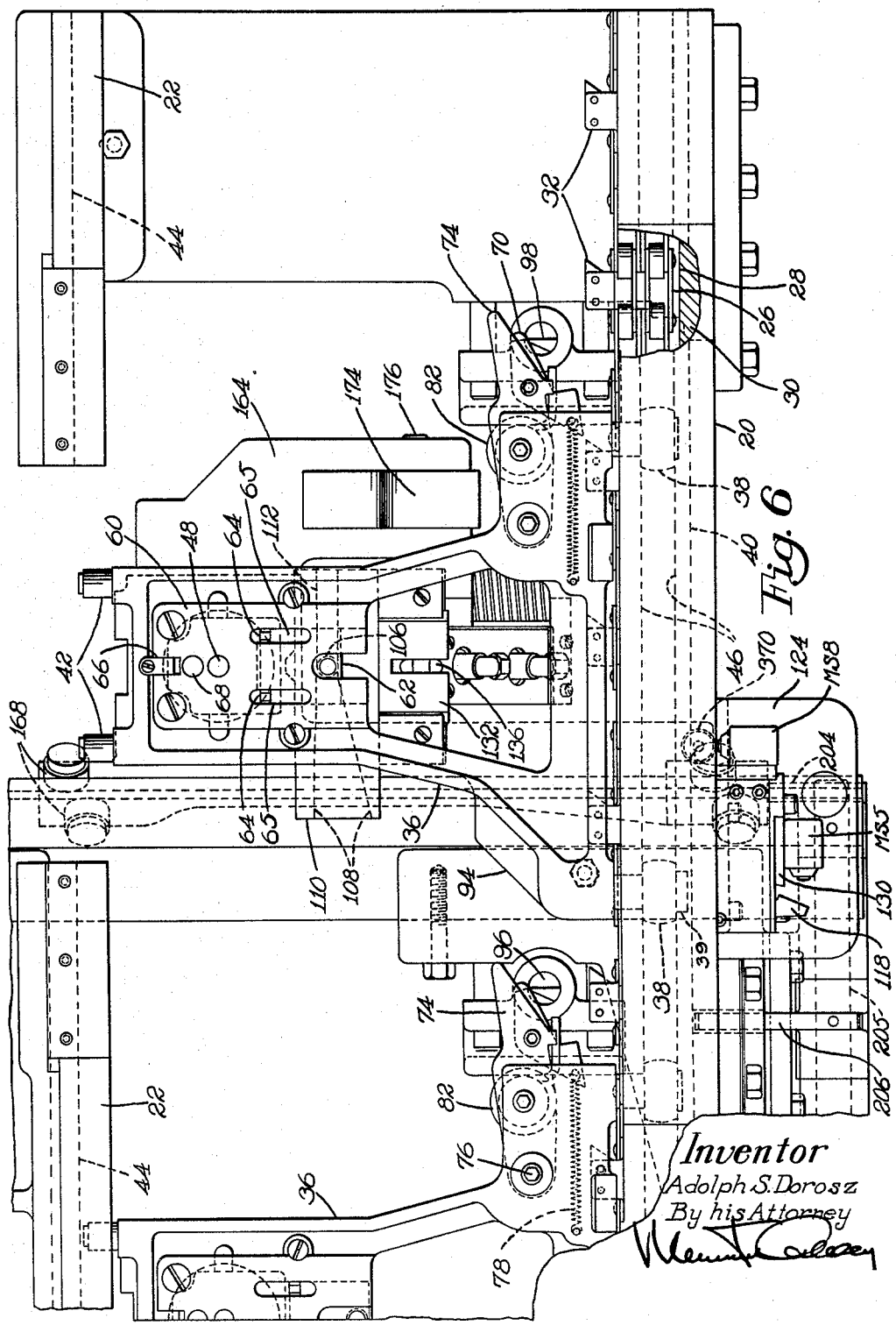
Fig. 6 is a plan view of the transfer mechanism with a pallet thereon at the transfer station and showing portions of the conveyor and control mechanism adjacent to this station.

Having broadly outlined the purpose and operation of the illustrated apparatus, there will next be described in detail work handing mechanism for effecting a flow of shoe-bearing pallets to and away from the machine according to its output. The conveyor 10 comprises standards 18 (Figs. 2 and 3), one at each end of the conveyor, which are connected by rails 20, 22 arranged in horizontal runs one of which is disposed substantially at the level of the operating tools of the machine 16, the other being near the floor. Continuous with these upper and lower runs of the rails are semicircular runs supported by the standards 18 concentric with sprockets 24, one of which is rotatably mounted upon each of the standards. An endless chain 26 (Figs. 6 and 10) runs over the sprockets and is received in a channel 28 formed in a bar 30 fixedly mounted contiguous to the rail 20. The chain 26 is provided with a series of lugs 32 which drive the pallets. The chain 26 is driven continuously by driving means (not shown) which is connected to one of the sprockets 24, this driving means being powered by an electric motor CM shown diagrammatically in Fig. 5.

Figure 7:
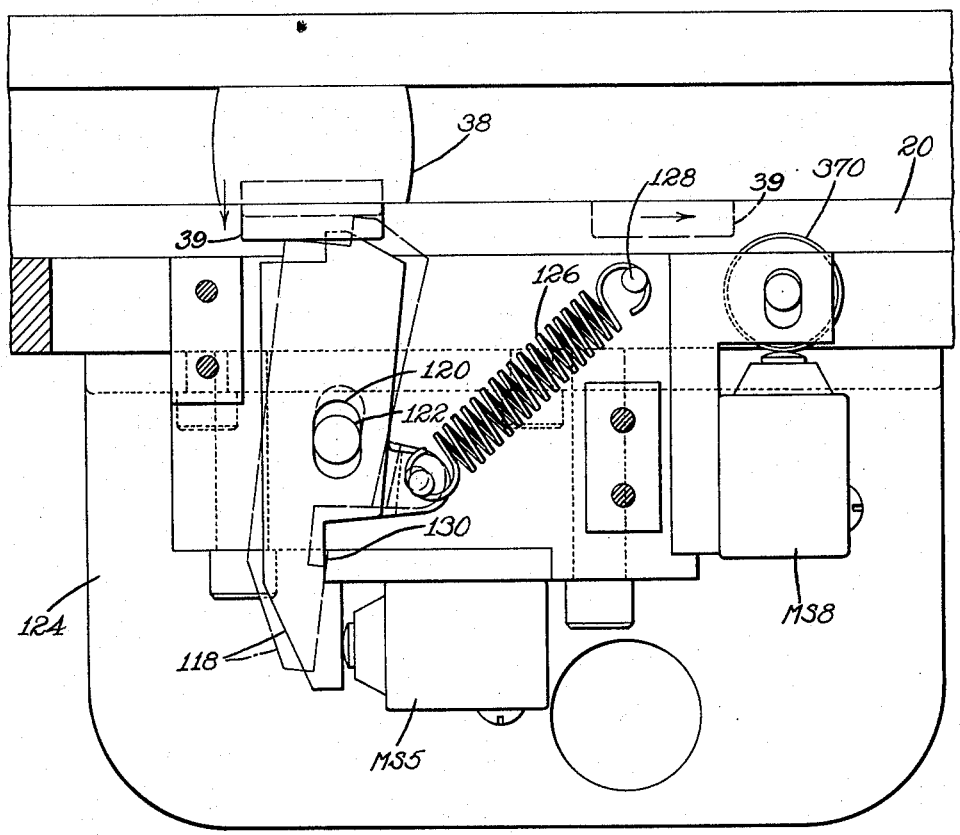
Figs. 7 and 8 are plan views showing, at an enlarged scale, control mechanism illustrated in Fig. 6.

Each pallet 12 comprises a frame 36 (Figs. 6 and 10) carrying at its forward side axles for a pair of rolls 38 which are received in a groove 40 in the rail 20. The axle 39 (Figs. 6 and 7) for the trailing roll 38 projects forwardly from the pallet farther than the axle for the leading roll does, and is an operating member for various control devices, to be described later, associated with the rail 20. Another pair of rolls 42 protruding from the rear side of the frame are received and run in a groove 44 formed in the rail 22. In order to avoid any cramping action of the pallets between the rails the rolls 38 are received between opposed shoulders at the sides of a channel 46 formed in the rail 20 at one side of the groove 40. Each pallet is provided with a pin 48 adapted to be received in the thimble of a last 50, the last illustrated herein being of the geometrically graded type disclosed in the above-mentioned Patent No. 1,948,547.

As is fully explained in the Topham patent, lasts of a series graded in this manner are proportional to one another. Use is made of the graded height of the heel part of the illustrated last in setting the machine 16 according to the size of the last, as will be more fully pointed out below. Moreover, the thimble of the last is also located in geometrically graded relation to the last, this feature further contributing to the uniform positioning of lasts of all sizes in the machine 16.

The illustrative last 50 has, in addition to the above-mentioned features of the Topham last, two sets of positioning surfaces, one set 52 (Figs. 13, 14 and 15) being disposed in a predetermined relation to the axis of the heel part of the last and the other set 54 being disposed in a predetermined relation to the longitudinal or turning axis of the last. These positioning surfaces, while they may be formed directly upon the last itself, are formed, as disclosed both herein and in the above-mentioned Hubbard et al. patent, upon a positioning plate 56 which is permanently fixed to the last in such a manner that the above-mentioned sets of positioning surfaces are centered with respect to the axes to which they are related. The positioning surfaces at each side of the plate are connected by parallel, inclined shoulders 58 for a purpose which will be pointed out later.

The pin 48 on the pallet is fixed to a base plate 60 (Figs. 6 and 12) which is secured to the pallet frame 36 and is recessed to receive a sliding positioning member 62. This member has a pair of fingers 64 which project upwardly through elongated slots 65 in the plate 60 and are spaced so as closely to receive either set of positioning surfaces 52, 54 mentioned above. As will be more fully described later, when the positioning member 62 is held with its fingers 64 in operative relation to the positioning surfaces 52, right and left shoes are properly positioned to receive a heel part operation. If a forepart operation is involved, requiring the alinement of the toe portion of the shoe with a machine, the positioning member 62 is moved forwardly of the pallet, to move the fingers 64 along the cam shoulders 58 and finally into engagement with the positioning surfaces 54, whereby the last is reoriented upon the pallet so that the toe portion of the last, whether it is a right or a left last, is alined with the machine. A spring clip 66 fixed to the pallet frame 36 and seated in a groove in the rear end of the positioning plate 56 releasably holds the last upon the pallet once it has been completely assembled thereupon. Directly behind the pin 48 there is slidably mounted upon the pallet frame an upwardly biased detent or tell tale 68 which normally projects above the plate 60 and at its lower end is flush with the lower surface of the pallet frame. However, when a last is fully seated upon the pallet the detent is depressed by the positioning plate 56 so as to project below the pallet frame, for purposes of actuating the control mechanism as will be described hereinafter.

A driving device associated with each pallet for yieldingly and releasably connecting it to the chain 26 comprises a hook 70 (Figs. 16, 17, 18 and 19) which is pivoted at 72 upon an arm 74, the latter being mounted to swing upon a stud 76 which is fixed to the pallet frame 36. The hook 70 and arm 74 are normally biased, as a unit, by a spring 78, stretched between the hook and a pin 80 on the frame 36, so as to bring the hook within the path of the lugs 32. The hook 70 is biased clockwise relatively to the arm 74 by a spring 82 which bears against a pin 84 on the hook with such a force as to permit a driving pressure of about 18 pounds to develop between the hook and the lug 32 engaging it. If a greater force is exerted against the hook, in case the pallet strikes an obstruction, the hook is swung counterclockwise by the lug 32 engaging it, against the resistance of the spring 82 out of the path of the lugs, whereby the pallet is disconnected from the chain 26. The spring 82 is wound about and has one end inserted into a cylindrical holder 86 which is fixed upon the arm 74 by a screw 87 in such a position as to provide tension in the spring suitable for insuring the above-mentioned limited driving force upon the hook 70.

At various stations of the conveyor there is a solenoid-operated stop, such as a stop 88 (Figs. 2 and 3) at the loading station. Each of these stops, when it is in its operative position, is so located as to be engaged by the forward end of the arm 74 of a pallet approaching the stop. A slope 90 (Figs. 16 and 19) on the arm 74 engaging the vertex of a wedge 91 formed upon the upper end of the stop, in response to advancing movement of the pallet, causes the arm 74 to be swung counterclockwise far enough to disengage the hook 70 from the associated lug 32, whereby the pallet is disconnected from the chain 26. A lip 92 formed upon the forward end of the hook 70 is carried, by the inertia of the pallet, into overlapping relation to the wedge 91, as illustrated in Fig. 19, so as to prevent retrograde movement of the pallet. There normally will be two empty pallets directly behind the leading pallet at the loading station, and each of these two pallets upon engaging the pallet ahead of it is disconnected from the chain 26 by the engagement of its arm 74 with a slope 94 (Fig. 6) formed upon the outer rear end of each pallet.

Upon placing a lasted shoe to be operated upon onto the leading pallet at the loading station, the above-mentioned detent 68 is depressed and operates a microswitch MS1 (Fig. 2) in the control mechanism, to be more fully described later, for energizing a solenoid S1 which retracts the stop 88 from the pallet and permits it to be advanced along the conveyor by the chains 26. Soon after such movement of the pallet begins, its detent 68 operates a microswitch MS2 which causes solenoid S1 to be deenergized and the stop 88 to return to its operative position whereby the next pallet is stopped at the loading station. The first pallet proceeds through a transfer hold-back station, having a stop 96 which is normally retracted, by a normally energized solenoid S3 under the control of a microswitch MS4, and into a transfer station where the pallet is arrested by a stop 98 (Figs. 2 and 6) which normally is in its operative position.

When the pallet moves into the transfer station, a dovetail slide 100 (Figs. 12 and 9) on the bottom of the frame 36 is assembled with a coupling member 102 carried by a vertically sliding post 104, this member and post being parts of the transfer mechanism 14. As the pallet moves onto the member 102 the rear rolls 42 on the pallet frame move out of engagement with the rear rail 22 (Fig. 6) which is interrupted at the transfer station in order to permit the unobstructed movement of the loaded pallet off the conveyor and into the machine 16.

Figure 13:
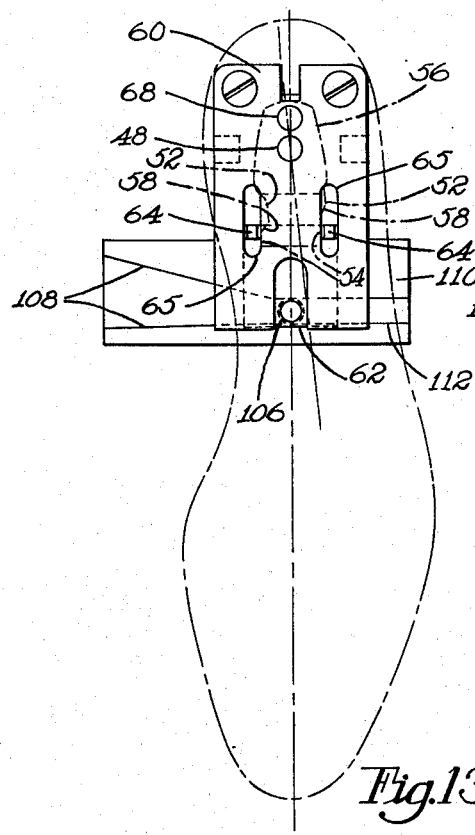
Figs. 13, 14 and 15 illustrate, diagrammatically, the positioning of right and left lasts on a pallet at the transfer station.
Figure 14:
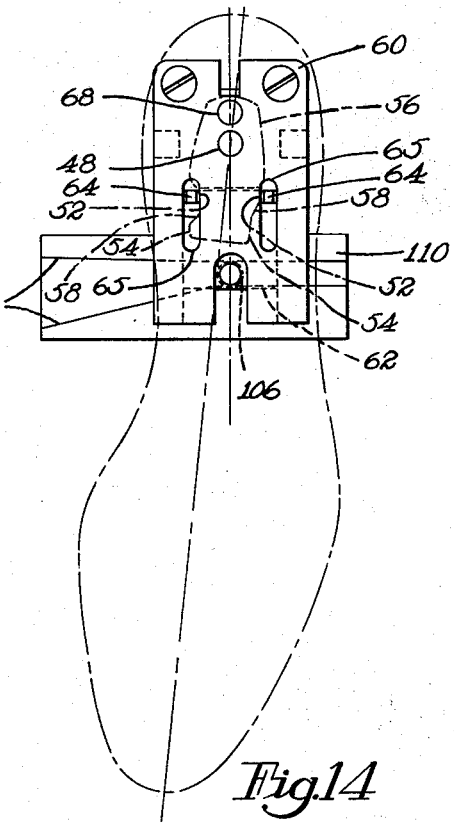
Figure 15:
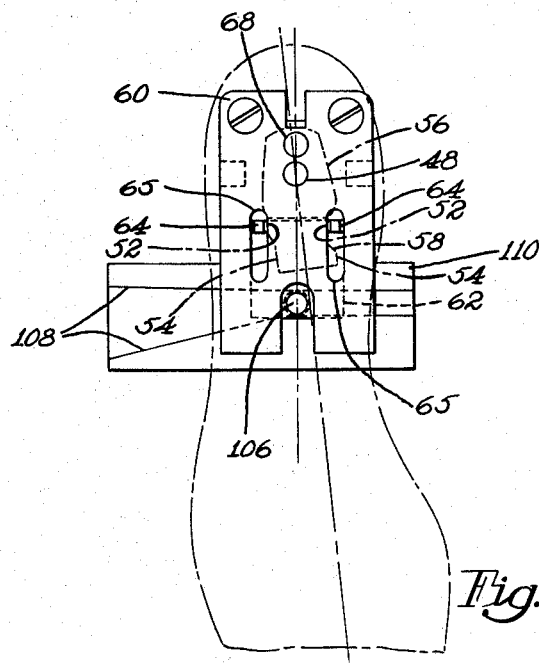
Figure 20:
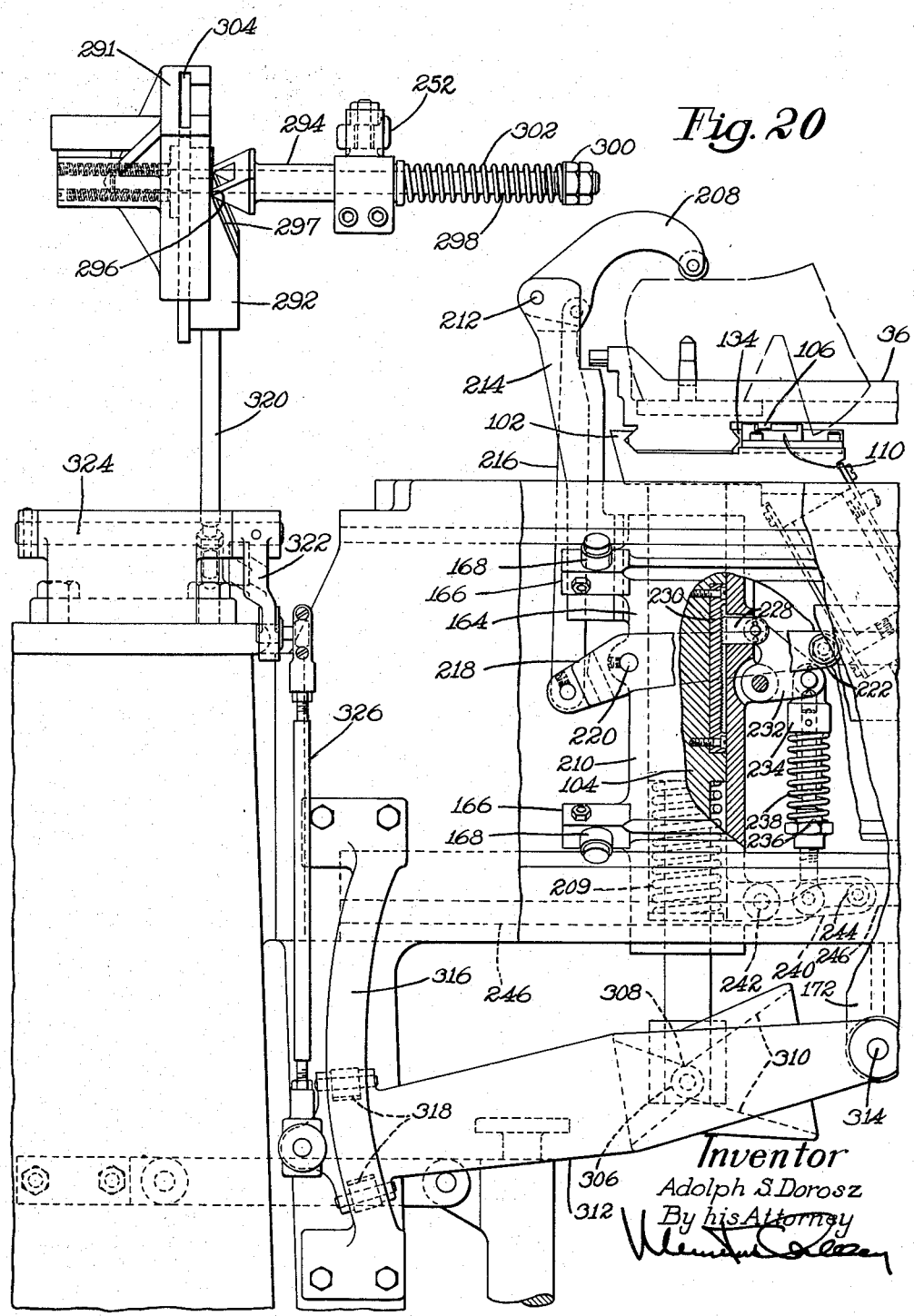
Fig. 20 is a side elevation of parts of the transfer mechanism and of mechanism for setting the machine, as viewed from the left.

The correct orientation of the last upon the pallet is obtained as the pallet moves into the transfer station by the connections next to be described. Upon the approach of the pallet to the transfer station, a roll 106 (Figs. 6, 11 and 12) associated with the positioning member 62, passes into a V-shaped recess 108 formed in the upper side of a plate 110 which is secured to the top of the member 102. When the pallet stops at the transfer station under the control of the stop 98, the roll 106 lies within a parallel sided groove 112 in the plate 110, just beyond the right hand end of the recess 108. The groove 112 is so located with relation to the pallet as to cause the member 62 to be positioned with its fingers 64 in engagement with the positioning surfaces 52, which are associated with the heel part axis, and are the appropriate set of positioning surfaces for orienting both right and left lasts for a heel part operation such as welt butting and tacking, as is illustrated by the identical relation of the heel part axes to the plate 110 in Figs. 14 and 15. If the positioning member 62 previously will have been moved into engagement with the other set of positioning surfaces 54 (Fig. 13), for positioning the last appropriately for a machine for operating upon the forepart, the roll 106 upon the approach of the pallet to the transfer station will engage the forward side of the groove 108 and will be moved into its position as illustrated in Figs. 14 and 15 to cause the fingers 64 to pass off the positioning surfaces 54, along the cam shoulders 58 and into engagement with the positioning surfaces 52. It is evident that the recesses 108 and 112 in the coupling member of a machine for performing a forepart operation would be inverted, as illustrated in Fig. 13.

The detent 68 (Figs. 11 and 12), which is freely received in a groove 114 in the member 102, is located, with the pallet in the transfer station, opposite to a slide 116 which is mounted to move freely forwardly and rearwardly of the member 102, for a purpose to be described later.

Figure 8:
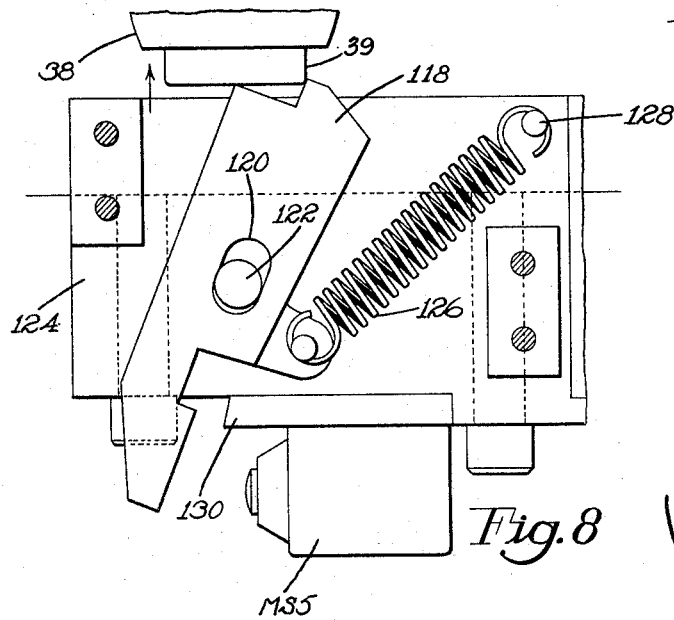

As a pallet enters the transfer station there is actuated mechanism for centering the pallet with respect to the member 102 and for clamping the pallet upon the member, which mechanism will next be described. A lever 118 (Figs. 6, 7 and 8), having an elongated slot 120 which receives a stud 122 carried by a bracket 124 on the conveyor frame, is biased into its normal position (solid lines, Fig. 7) by a spring 126 which is stretched between the lever and a pin 128 fixed to the bracket. With this lever in its normal position, its forward end is hooked about a plate 130 in such a position as to depress a microswitch MS5; and with the lever in this position, its rear end lies within the path of movement of the axle for the trailing roll 38 on the pallet. Accordingly, as the pallet enters the transfer station, the lever 118 is moved into and is temporarily held in the position illustrated in Fig. 8, causing the release of switch MS5. Such release of the switch MS5 actuates fluid operated mechanism for causing a pallet clamping and centering slide 132 (Figs. 11 and 12), mounted on the dovetail slide 100, to be moved into engagement with the dovetail slide 100.

Projecting from the end of the slide 132 adjacent to the pallet is a tongue 134 which fits a complemental recess in the slide 100 for purposes of centering the pallet upon the member 102. The slide 132 is operated by a bell crank 136 which is pivoted at 138 on the member 102 and is connected to a piston rod 140 (Fig. 10) carrying a piston 142 which reciprocates within a cylinder 144, the latter being fixed to the member 102.

Fluid pressure is supplied to the upper and lower ends of the cylinder by pipes 146, 148, respectively, which lead from a valve 150 (Fig. 4) which is set by solenoids S4 and S8 (selectively energized under the control of the microswitch MS5) so as to cause the slide 132 either to grip or release, respectively, the pallet. The valve is self-centering when neither solenoid is energized, and permits no flow of fluid into or out of the cylinder 144 when in its central position.

The valve 150, the pipes 146, 148 and cylinder 144 are parts of a fluid pressure system to which fluid pressure is supplied by a pump 152 which is driven by a motor PM, the pump being connected to the valve by a pipe 156 and being supplied with fluid from a sump 158 by a pipe 160.

When solenoid S8 is energized, MS5 normally being depressed by the lever 118 in its solid line position (Fig. 7), the valve 150 is set to direct fluid pressure through the pipe 148 into the lower end of the cylinder 144, causing the slide 132 to be retracted from the pallet; and with this setting of the valve 150 the upper end of the cylinder 144 is vented through the pipe 146 and another pipe 162 into the pipe 160 and sump. Conversely, when the lever 118 is moved away from microswitch MS5 and solenoid S4 is energized, as upon the entry of the pallet into the transfer station, the valve 150 is set to supply fluid pressure to the upper end of the cylinder 144 whereby the slide 132 is operated to center and clamp the pallet upon the member 102.

The above-mentioned stop 98, before it arrests the pallet at the transfer station, will have been engaged by the arm 74 of the pallet which arm is swung out of engagement with the chain 26 when the pallet is an inch, or less, away from its final position at the transfer station. At about the same time when the pallet is disconnected from the chain, the lever 118 is moved away from microswitch MS5 and, while the pallet is proceeding into the transfer station, under its inertia, the slide 132 is advanced toward the pallet. The tongue 134 may engage the pallet either before or after the pallet arrives at the transfer station. In the former case, the tongue rides against the forward edge of the dove-tail slide 100 until the recess in the slide for receiving the tongue is brought into register with the tongue.

Toward the end of the clamping action described above, other fluid operated mechanism, next to be described, is actuated to impart an advancing movement to the transfer mechanism whereby the pallet with a lasted shoe thereon is carried from the transfer station into the operating station at the machine 16.

The transfer mechanism comprises supporting structure for the post 104 including a yoke 164 (Figs. 1, 9, 10 and 20) in which the post slides vertically, the yoke being fixed upon a carriage 166 on which are mounted four pairs of rolls 168. The rolls run upon rails 170, the latter being fixed to a base 172 which is secured to the frame of the machine 16. The carriage 166 is moved along the rails by connections including a lever 174 which at its lower end is hinged upon the base 172 and at its upper end is slotted to receive a pin 176 carried by the yoke 164. To the mid portion of the lever 174 is pivoted a piston rod 178 which runs in a cylinder 180, the latter being pivotally mounted at 182 upon the frame of the machine 16. Fluid pressure is supplied to the forward end of the cylinder 180 from a directional valve 184 (Fig. 4) through pipes 186 and a buffer valve 188 for restricting the flow of fluid to the cylinder 180 during the advancing transfer movement of the transfer mechanism so as to cause a portion of this movement to occur at a reduced velocity, for a purpose to be explained later. The valve 188 is operated by a solenoid S6 which, when energized, sets the valve so as not to obstruct the flow of fluid through the pipes 186. However, when the solenoid is de-energized the valve springs into a setting for throttling the flow of fluid through the pipes. A pipe 190 conducts fluid from the valve 184 to the rear end of the cylinder 180 when the valve is set to return the transfer mechanism to the transfer station.

Fluid pressure is supplied to the valve 184 through a pipe 192 via a pressure regulating valve 194 which is connected to the pump 152 by piping 196. The valve 184 is vented into the sump 158 through a pipe 198.

During the latter part of the clamping movement of the slide 132 toward the dovetail slide 100 on the pallet, mechanism next to be described actuates the transfer mechanism to carry the lasted shoe from the transfer station into the machine 16. The left-hand end of a lever 199 (Figs. 11 and 12), which is pivoted at 200 upon the slide 132, is brought into engagement with the outer end of the above-mentioned slide 116 as the slide 132 approaches the end of its clamping movement. As there is a lasted shoe upon the pallet and the detent 68 is in its depressed position, the latter now prevents further rearward movement of the slide 116; but the lever 199 continues to move with the slide 132 and is swung upon the slide 132 counterclockwise. With such movement of the lever, a beveled shoulder 202 at its right hand end forces downwardly a plunger 203 for operating a microswitch MS6 which, upon being depressed, causes the energizing of the above-mentioned solenoid S5 for setting the valve 184 so as to supply fluid pressure to the forward end of the cylinder 180 and to drive the piston rod 178 rearwardly. Thus, the advancing transfer movement of the transfer mechanism 14 is initiated.

When the transfer mechanism is at the transfer station, the carriage 166 engages an arm 204 (Figs. 9 and 6) which is fixed to a shaft 205 pivotally mounted upon the base 172. Another arm 206, also fixed to this shaft, has a bent end which extends into a slot in the rail 20, immediately ahead of the pallet at the transfer hold-back station but out of its path. However, with rearward movement of the carriage 166, when the advancing transfer movement begins, the arm 206 also moves rearwardly under the influence of a spring (not shown) so that its upper end projects into the path of the leading roll 38 on the pallet at the transfer hold-back station whereby the latter is prevented from moving away from the transfer hold-back station in case the stop 96 should not function properly.

At about the middle of the advancing transfer movement, a normally closed microswitch MS11 (Fig. 9) is operated by a shoe 207 fixed upon the carriage 166 to de-energize solenoid S6 (Fig. 4) which permits the buffer valve 188 to spring into its setting for restricting the flow of fluid to the piping 186, whereby the advancing transfer movement is reduced so long as MS11 is depressed. During this period, mechanism next to be described registers the size of the work and sets or adjusts the operating tools of the machine 16 in accordance with the size of the work.

The size of the work is registered by moving an arm 208 (Figs. 1, 9 and 20) downwardly, in engagement with the heel seat of the shoe, into a predetermined position heightwise of the machine which results in lowering the post 104, to an extent dependent upon the height of the heel part of the last. Such movement of the post is resisted by a spring 209 which is coiled about the lower portion of the post 104 and is compressed between the latter and the bottom of a sleeve 210 which is integral with the carriage 166. The arm 208 is pivoted at 212 upon a bracket 214 which is fixed to the yoke 164. To the arm 208 is pivoted the upper end of a link 216 the lower end of which is pivoted to a lever 218, the latter being rotatably mounted upon a rod 220 which is fixed to the sleeve 210. The lever 218 at its forward end carries a roll 222 which, during the first part of the advancing transfer movement runs up a slope 224 (Fig. 9) of a cam 226 which is fixed to the base 172, causing the arm 208 to be lowered through its size registering movement. The upper end of the slope 224 merges into an elevated horizontal section of the cam which is so located as to cause the arm 208 and the work to be held at the desired predetermined height with respect to the machine during the time needed for setting the tools of the machine 16 according to the size of the work. Soon after the roll 222 enters the elevated portion of the cam 226, the post 104 is locked to the yoke 164 by a serrated pawl 228 (Fig. 20) which is moved into engagement with a serrated plate 230, the latter being fixed to the post 104. The pawl 228 is operated by a bell crank 232 which is pivoted upon the yoke 164 and is driven by a yielding link comprising telescoping members 234, 236 between which is compressed a spring 238. The member 236 is pivoted to a lever 240 which is hinged at 242 upon the yoke 164 and carries at its forward end a roll 244 which runs in a cam 246 fixed to the base 172. The cam 246 has a hump 247 (Fig. 9) which, through the connections above described, causes the pawl 228 to lock the post 104 against movement heightwise thereof while the roll 222 on the lever 218 traverses the elevated section of the cam 226. During this period, the operating tools of the illustrated machine 16, which is like that disclosed in United States Letters Patent No. 1,839,852, granted January 5, 1932, on an application of R. H. Lawson, are adjusted laterally of each other in accordance with the size of the lasted shoe to be presented to the machine.

Figure 21:
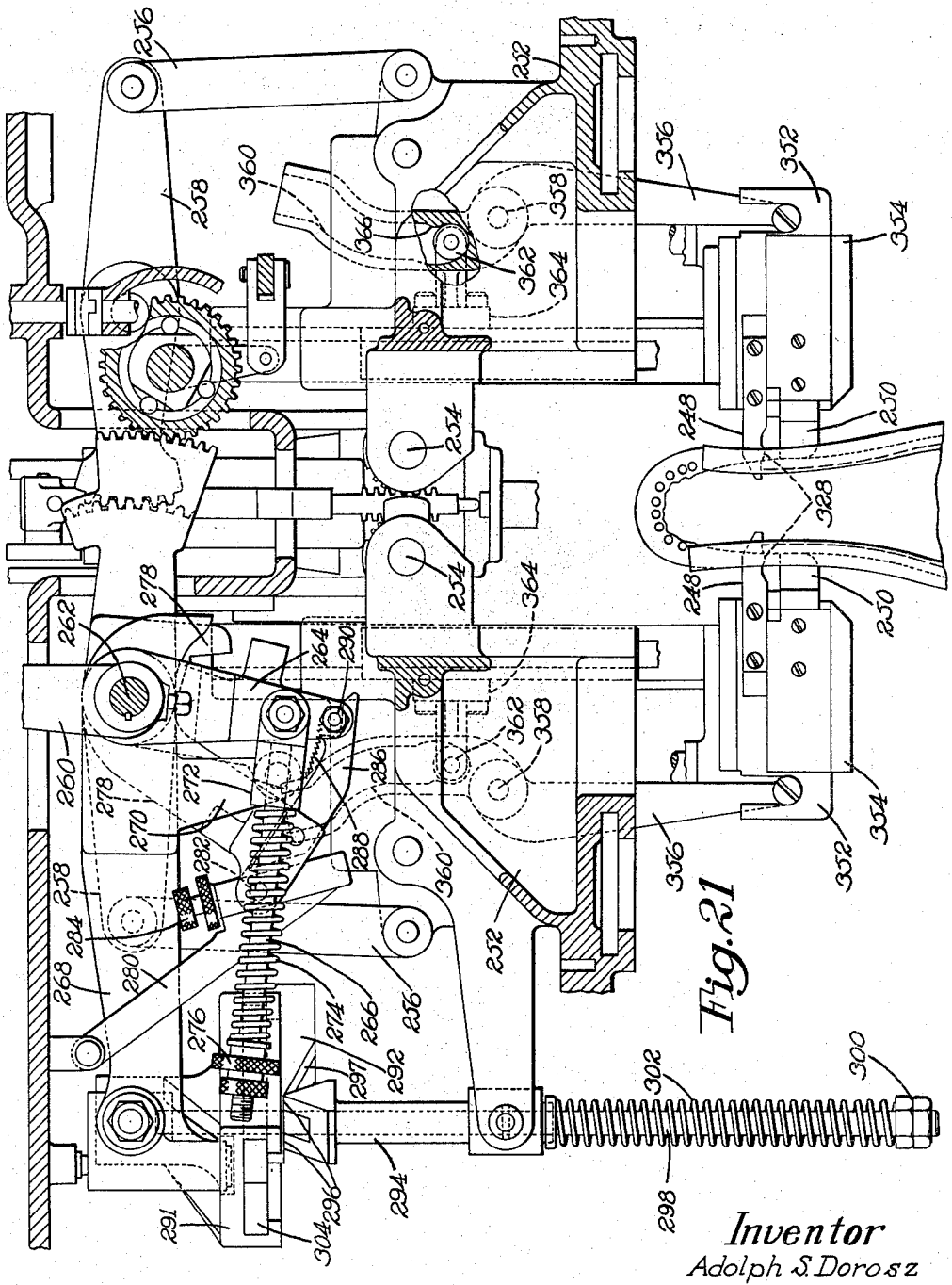
Fig. 21 is a sectional plan view of the machine illustrating the mechanism for setting the machine.

The operating tools comprise, with tacker nozzles and butting knives (not shown), anvils 248 (Fig. 21) with which the knives cooperate to make butting cuts upon the welt, and crease finders 250. These operating tools are provided in two sets, each of which is associated with one of a pair of tool heads 252, the latter being mounted to swing toward and away from each other upon vertical shafts 254 between their inoperative and operative positions and to accommodate shoes of different sizes. To the heads 252 are pivoted parallel links 256, 256, the latter being connected to meshing geared levers 258, 258 so that the movements of the tool heads 252 toward and away from each other are always equal and opposite. These movements of the tool heads are effected by a lever 260, operated by means of a cam (not shown), through the following mechanism.

The lever 260 is keyed to a vertical shaft 262 and has an arm 264, adjacent to the outer end of which is swiveled a rod 266. Beneath the lever 260 and freely rotatable on the shaft 262 is a lever 268 having an arm 270. The rod 266 passes through a block 272 swiveled to the end of the arm 270 and a compression spring 274 is interposed between one face of this block and an adjustable abutment 276 threaded on the outer end of the rod. Counterclockwise movement of the arm 264 thus causes the lever 268 to be urged in the same direction through the spring 274. Beneath the lever 268 is another arm 278 which is freely rotatable upon the shaft 262. The normal position of the arm 278 is determined by a link 280 pivoted to the frame and having a slotted end which receives a pin 282 carried by the arm. A spring-pressed plunger (not shown) in the link 280 urges this pin against the end of an adjusting screw 284 threaded in the link for varying the normal position of the arm 278. A pawl 286 is pivoted to the arm 278 and is biased by a spring-pressed plunger (not shown) toward a ratchet 288 formed on the arm 270, engagement of the pawl with the ratchet being prevented, when the parts are in the position shown, by a pin 290 mounted upon the arm 264 adjacent to the end of the pawl.

The arm 268 is connected to the left-hand head 252 by mechanism comprising a member 291, which is pivoted to the arm, a cam block 292 and a bearing sleeve 294 which at its forward end is pivoted on the left-hand head 252 and which at its rear end is provided with a pair of knife edges 296 which seat upon a slope 297 formed upon the block 292. A rod 298 threaded into the member 291 is received freely by the sleeve 294 and carries upon its outer end a pair of check nuts 300 between which and the forward end of the sleeve 294 there is compressed a spring 302. The block 292 is mounted to slide in a T-slot 304 formed in the member 291 and, according to the part of the slope 297 presented to the knife edges 296, positions the left-hand head 252 relatively to the lever 268. The right-hand head 252 is correspondingly positioned through the links 256, 256 and levers 258, 258. The lever 260 is moved counterclockwise through a predetermined stroke during the operating cycle of the machine to cause the heads 252 to be swung from their inoperative positions into their operative positions as the shoe is moved into the machine; and toward the end of the operating cycle of the machine, the lever 260 is swung in the opposite direction to return the heads 252 to their inoperative positions. The heads are adjustably spaced from each other, so that the shoe is closely received between the crease finders 250, by positioning the above-mentioned cam block 292 appropriately for the size of the shoe to be operated upon.

The mechanism for thus adjusting the cam block 292 will next be described. When, as explained above, the arm 208 (Figs. 1, 9 and 20) will have been lowered to cause a predetermined depression of the post 104 according to the size of the work (height of the heel part) on the pallet, and the pawl 228 will have been moved into engagement with the plate 230 to lock the post 104 against vertical movement, a roll 306 mounted upon the lower end of the post approaches a restriction 308 in a cam 310 which is integral with a lever 312. This lever is pivoted at 314 upon the base 172 and its rear end is guided for movement in a vertical plane between bearing surfaces upon the base 172 and a guide 316 fixed to the base, these surfaces being engaged by rolls 318 on the lever. When the roll 306 passes through the restriction 308, the lever 312 is positioned according to the height of the roll 306 and the above-mentioned cam block 292 is correspondingly positioned through the following connections between it and the lever. The cam block is fixed upon a rod 320 the lower end of which is pivoted to one arm of a bell crank 322, the latter being rotatably mounted upon a bracket 324 fixed to the frame of the machine. The other arm of the bell crank is connected by a link 326 to the rear end of the lever 312.

Before the roll 306 enters the cam 310, the shoe 207 depresses the microswitch MS11 which causes solenoid S6 (Fig. 4) to be de-energized and the valve 188 to be set so as to restrict the flow of fluid through the pipe 186 into the cylinder 180. Accordingly, the advancing transfer movement occurs at a diminished rate while the adjustment of the tool heads 252 is effected. After the roll 306 moves beyond the restriction 308, the shoe 207 moves off the microswitch MS11 causing the solenoid S6 to be re-energized and the valve 188 to be reset so that the carriage moves at its normal speed through the remainder of its advancing stroke toward the machine.

Soon after the roll 306 leaves the cam 310 and while the post 104 is still locked by the pawl 228 to the yoke 164, the heel end of the shoe is carried beneath the tool heads 252 at such a level that the crease finders 250 are seated in the welt crease and the anvils 248 are disposed between the shoe bottom and the welt ends. The pawl 228 and the arm 208 are then retracted from the plate 230 and shoe, respectively, as a result of the rolls 244 and 222 being moved into the lower rearward portions of the tracks in the cams 246, 226. The shoe is now pressed upwardly by the spring 209 to cause the bottom of its heel part to be seated against the crease finders 250 which act as an abutment or work rest for positioning the shoe vertically with respect to the tool heads. The forward edges of the anvils 248 have lobes 328 formed thereon and are sharpened so that they sever the inseam stitching, with the advance of the shoe into the machine, up to the point where the butting cut is made upon the welt.

The advance of the shoe into the machine is terminated, and variably limited according to the size of the shoe, by the engagement of a serrated block 330 (Figs. 1 and 9) which is clamped in a holder 331 fixed to the post 104, with a serrated stop 332, the latter being fixed to the frame of the machine. The cooperating surfaces on the block and stop are formed on a slope which corresponds to the grading ratio of the lasts. Thus, the larger the lasts the lower will be the position of the block 330 and the farther into the machine the last will be permitted to go before its operative position in the machine is established by the engagement of the block with the stop 332. Just before the work arrives at the operating station a sloping shoulder 334 on the holder 331 operates a trip rod 336 for actuating a clutch unit 338 (Fig. 1) having fixed upon its input shaft a driving pulley 340 which is connected to a motor WM (shown diagrammatically in Fig. 5) by a belt 342. Through connections between the trip rod and the clutch unit comprising a lever 344, which is operated by the trip rod, and a link 346 which connects this lever with a second lever 348 engaging the clutch unit, the latter is operated to impart one revolution at a time to the main drive shaft 350 of the machine 16.

At the beginning of the cycle of the machine, which is initiated just before the work is fully brought into the operating station, the anvils 248 are advanced toward each other, as is usual in this type of machine, to insure that they will be fully inserted beneath the welt ends. For this purpose, the anvils are mounted upon slides 352 which are mounted for lateral movement within holders 354 for the crease finders 250. The outer end of each slide 352 is slotted to receive the forward arm of a lever 356, one being pivotally mounted at 358 upon each of the heads 252. A rearwardly extending arm on each of the levers 356 is provided with a cam slot 360 in which runs a roll 362 carried by a slide 364, one for each of the heads 252. The slides are reciprocated forwardly and rearwardly of the machine once for each of its cycles of operation. The cam slots 360 are shaped, in the present machine, the same as in prior machines except for the provision of humps 366 and conjugate hollows opposite thereto which, in being passed by the rolls 362, cause the anvils 248 to be quickly moved away from and then toward each other at the end of the forward movement of the rolls 362. This slicing action of the anvils, which occurs while the shoe is coming to rest at the operating station, insures that their cutting action upon the inseam stitching will be complete and that the severance of the stitching will be carried forwardly of the shoe to points corresponding to the forward portions of the lobes 328.

The other usual events in the cycle of this machine now take place. That is, the tool heads are brought toward each other into their operative positions, a fluid-operated abutment 367 is brought upwardly into engagement with the bottom of the post 104, the welt butting cuts are made upon the welt, and a tack is driven through each welt end into the shoe.

Soon after the beginning of the machine cycle, a cam 368 on the drive shaft 350 of the machine 16 releases a microswitch MS7 which prepares the control mechanism for returning the transfer mechanism to the transfer station, as will be described later, at the end of the cycle. Notwithstanding the release of microswitch MS7, a circuit is maintained for energizing solenoid S5 (Fig. 4) so that the transfer mechanism will be urged toward the machine throughout its operating cycle. When, near the end of the cycle, microswitch MS7 is depressed, solenoids S5 and S7 are de-energized and energized, respectively, causing the valve 184 to be set for returning the transfer mechanism from the machine 16 to the transfer station at the conveyor.

As the pallet closely approaches the transfer station, the inner end of the lever 118 (Fig. 7) is engaged by the axle 39 for the trailing roll 38 and the lever is pushed forwardly into hooked engagement with the plate 130 whereupon the microswitch MS5 is again depressed. Such operation of this switch results in the retraction of the slide 132 (Fig. 12) from the pallet, whereby the latter is unclamped from the member 102. Simultaneously with the unclamping of the pallet, solenoid S9 is energized and the transfer station stop 98 (Fig. 6) is retracted, whereupon the pallet is connected to the chain 26 and departs from the transfer station.

Immediately after the pallet starts to move out of the transfer station, the axle 39 for the trailing roll 38 on the pallet displaces a roll 370 (Fig. 7), mounted upon the rail 20 for movement transversely thereof, into engagement with a microswitch MS8, causing solenoid S3 for operating the transfer hold-back station stop 96 to be energized and the stop to be retracted, whereby the pallet at this station, or the next one to pass through it, is permitted to proceed into the transfer station. This depressing of MS8 also causes various parts and circuits of the control mechanism for the transfer mechanism to be reset, as will be described later, in readiness to repeat another cycle of operation of the transfer mechanism when the microswitch MS4 is again depressed.

The pallet which has left the transfer station advances along the conveyor until it is arrested at an unloading station by a stop 372 which is operated by a solenoid S10. The space between the stop 372 and the above-mentioned roll 370 is so determined, with reference to the length of the pallet, that if pallets pile up behind the stop 372 so that there no longer is room for a pallet beyond the roll 370, the pallet next to depart from the transfer station will be stopped, before it can strike the roll 370, by the pallet ahead of it. Accordingly, if there is insufficient room on the conveyor immediately beyond the transfer station fully to receive a pallet, microswitch MS8 will not be operated and the stop 96 at the transfer hold-back station will not be retracted to release the leading pallet for movement into the transfer station. At the unloading station, it may be desired to perform a manual operation upon the shoe such as attaching a shank piece thereto or applying filling material to the shoe bottom, upon the completion of which the lasted shoe is removed from the pallet. Upon the arrival of the pallet at the unloading station, the detent 68 depresses a microswitch MS9 (Figs. 2 and 3) which prepares a circuit for energizing solenoid S10 and effecting the retraction of the stop 372. When the lasted shoe is removed from the pallet, permitting the detent 68 to rise and the microswitch MS9 to be released, solenoid S10 is energized and the stop 372 is retracted whereupon the unloaded pallet proceeds along the conveyor toward the loading hold-back station.

As the empty pallet departs from the unloading station a microswitch MS10 is momentarily depressed, causing the circuit, through which solenoid S10 is energized, to be opened. The solenoid is now de-energized and the stop 372 returns to its operative position to arrest the succeeding pallet at the unloading station. The empty pallet is stopped at the loading hold-back station, if the latter is empty, by a stop 374 which is operated by a solenoid S2; but if, as usual, one or more empty pallets will already have been detained at this station, the pallet approaching the station will be disconnected from the chain 26 and stopped by the engagement of its arm 74 with the slope 94 of the trailing pallet of those already detained by the stop 374.

There will now be summarized, by reference to Figs. 2, 3, 4 and 5, the operation of the controls for the illustrated apparatus and how they effect the progress of all the pallets around the conveyor and into and out of the machine.

It is to be assumed that there are three pallets at the loading station and that the remainder of the pallets are at the loading hold-back station awaiting release for movement to the loading station. When the operator places a lasted shoe upon the leading pallet at the loading station, depressing the detent 68 of this pallet, microswitch MS1 (normally open) is closed by the detent, causing coil K8 (Fig. 5) to be energized and contactors K8A and K8B to be closed. Through contactor K8A and microswitch MS2 (normally closed) there is closed a holding circuit for coil K8. By closing contactor K8B there is closed a circuit for energizing solenoid S1 which retracts the loading station stop 88, permitting the departure of the leading pallet from this station.

Soon after the pallet moves away from the loading station, microswitch MS2 is momentarily depressed by the detent 68, whereupon its normally closed contacts are opened and its normally open contacts are closed. When the normally closed contacts are opened, coil K8 is de-energized and contactors K8A and K8B are opened. Accordingly, solenoid S1 is de-energized and the loading station stop 88 returns to its operative position so as to detain the next pallet at the loading station. The closing of the normally open contacts of microswitch MS2 causes coil K1 to be energized and contactors K1A and K1B to be closed. The closing of contactor K1A closes a holding circuit for the coil K1 and the closing of contactor K1B closes a circuit for energizing solenoid S2 which retracts the loading hold-back station stop 374 away from the leading pallet at this station to permit its advance toward the loading station.

The pallet now departing from the loading hold-back station momentarily opens microswitch MS3 (normally closed) which opens the holding circuit (including the contactor K1A) for the coil K1 whereby the latter is de-energized. Accordingly, contactors K1A and K1B are opened and solenoid S2 is de-energized, whereupon the loading hold-back station stop 374 is released in time to detain the next pallet at this station.

The loaded pallet which has just left the loading station upon approaching the transfer hold-back station, momentarily closes microswitch MS4 (normally open), closing a circuit for energizing the coil K2L, whereupon contactor K2A (normally closed) is opened and locked open, and contactors K2B and K2C are closed and locked closed. The opening of contactor K2A opens a circuit including solenoid S3 which is now de-energized, causing the release of the transfer hold-back station stop 96 for movement into its operative position, whereby the next pallet is detained at this station if the preceding pallet has not already cleared the machine. The closing of contactor K2B closes a circuit including a normally closed contactor K6B and a solenoid S7, whereupon this solenoid is energized and the valve 184 is set so as to cause the transfer mechanism to be urged into the transfer station. The closing of contactor K2C closes a circuit including a normally closed contactor K7B and the solenoid S8 which, upon being energized, causes unclamping pressure to be imparted to the slide 132. Thus, just in advance of the arrival of the pallet at the transfer station the coupling member 102 is properly positioned and prepared to receive a pallet.

Upon the entry of a pallet into the transfer station the pallet disengages the lever 118 from the plate 130 (Fig. 8) releasing microswitch MS5 (normally depressed) and causing its normally closed contacts (Fig. 5) to be opened and its normally open contacts to be closed. Upon the closing of the normally open contacts of this switch, a circuit including a switch AUX7 (normally closed) and a coil K7 is closed, the coil is energized, and contactors K7A (normally open) and K7B (normally closed) are closed and opened, respectively. The closing of contactor K7A closes a circuit including solenoid S4 which is energized and sets the valve 150 so as to cause the slide 132 (Figs. 11 and 12) to center and apply clamping pressure to the pallet on the member 102. Similarly, the opening of contactor K7B opens a circuit including solenoid S8 whereby the latter is de-energized and the valve 150 is permitted to respond freely to the action of solenoid S4. Thus, the clamping and centering of the pallet upon the coupling member 102 by the slide 132 and its tongue 134, is completed.

Near the end of the clamping movement of the slide 132, the lever 199 (Fig. 12) is swung over the plunger 203 which depresses microswitch MS6 (normally open) whereupon a circuit including a contactor K5B (normally closed) and a coil K6 is closed, and the coil is energized. Accordingly, a contactor K6B (normally closed) is opened and a normally open contactor K6A is closed. The opening of contactor K6B, in the circuit including solenoid S7, causes the latter to be de-energized, thus freeing the valve 184 for resetting in response to the action of solenoid S5 which, being included in the circuit with contactor K6A (now closed), is now energized. Thus, the valve 184 is set to cause the transfer mechanism to be advanced from the transfer station into the operating station.

During the period in the advancing transfer movement when the roll 306 passes through the cam 310 (Figs. 9 and 20) and the operating tools of the machine are set according to the size of the shoe on the pallet, the shoe 207 depresses the microswitch MS11 to open a circuit including the solenoid S6, whereupon the latter is de-energized and the valve 188 springs into its setting for restricting the flow of fluid through the pipe 186. Accordingly, the transfer movement is slowed down throughout the period while the setting of the operating tools of the machine takes place. After the setting of the tools has been completed, the shoe 207 is moved beyond and releases the microswitch MS11 whereby solenoid S6 is energized again and the valve 188 is set to permit the free flow of fluid through the pipes 186 and to cause the higher speed of the transfer movement to be resumed.

Just before the lasted shoe arrives at the operating station, as determined by the engagement of the stop 330 and abutment 332, the trip rod 336 is depressed and there is initiated a cycle of operation of the machine 16 during which the welt ends of the shoe are trimmed and tacked against the shoe bottom.

Immediately after a cycle of operation of the machine is begun, the cam 368 (Fig. 1), which normally depresses and holds the microswitch MS7 open, releases the switch permitting it to close a circuit including the coil K4 which is now energized and contactors K4A and K4B are closed. When contactor K4A is closed, coil K5 is energized whereupon contactors K5C and K5A are closed and contactor K5B (normally closed) is opened. The opening of contactor K5B does not result in the de-energizing of coil K6 because the latter is included in a closed circuit comprising closed contactor K4B and microswitch MS7. The transfer mechanism is thus biased into at the operating station throughout the machine cycle. The closing of contactor K5A completes a holding circuit for coil K5 and the closing of contactor K5C prepares a circuit for energizing solenoid S9 through microswitch MS5 when the latter is next operated, upon the return of the transfer mechanism to the transfer station.

Near the end of the machine cycle, microswitch MS7 is depressed, opening the circuit to and de-energizing coil K4, whereupon contactors K4A and K4B open. Although contactor K4A is opened, coil K5 remains energized through the holding circuit including contactor K5A. The simultaneous opening of MS7 and contactor K4B results in the de-energizing of coil K6, whereupon contactor K6A is opened and contactor K6B is closed. When contactor K6A opens, the circuit including solenoid S5 is opened, the solenoid is de-energized, and its effect upon the valve 184 is nullified. With the closing of contactor K6B, solenoid S7 is energized through contactor K2B and, accordingly, the valve 184 is set to cause the return of the transfer mechanism from the operating station to the transfer station.

Upon the return of the transfer mechanism to the transfer station, the lever 118 (Fig. 7) is moved outwardly by the axle 39 and snaps into locking engagement with the plate 130 causing microswitch MS5 to be depressed. The newly opened upper contacts of microswitch MS5 (Fig. 5) being in a circuit including switch AUX7 and coil K7, the latter is now de-energized. Thereupon, contactor K7A is opened causing solenoid S4 to be de-energized and clamping pressure to be removed from the slide 132. At the same time, contactor K7B returns to its normally closed state which results in the energizing of solenoid S8, whereupon the valve 150 is set so as to cause the slide 132 to be retracted from the pallet. Also, when microswitch MS5 is depressed, a circuit is closed including contactor K5C and solenoid S9. The energizing of this solenoid results in the retraction of the stop 98 at the transfer station and the release of the pallet for movement out of the transfer station.

Soon after the pallet leaves the transfer station it momentarily depresses microswitch MS8, closing contacts which complete a circuit including coil K2UL which, when energized, causes contactor K2A to be unlocked and permitted to close and contactors K2B and K2C to be unlocked and permitted to open. The closing of contactor K2A completes a circuit including solenoid S3 which, upon being energized, retracts the transfer holdback station stop 96 so as to allow the pallet at this station to advance into the transfer station. The opening of contactors K2B and K2C opens circuits including solenoids S7 and S8, respectively, which become de-energized. Thereupon, the valves 184 and 150 resume their centered settings and no driving force, in either direction, is applied to the transfer mechanism or to the slide 132 until microswitch MS4 is next depressed. The depressing of microswitch MS8, also opens the circuit including contactor K5A and coil K5, whereupon the coil is de-energized, the contactor K5A opens, the contactor K5B closes, and the contactor K5C opens. The opening of contactor K5C causes solenoid S9 to be de-energized, whereupon the stop 98 returns to its operative position in time to arrest the pallet which has just been released from the transfer holdback station. The control circuits and mechanism associated with the transfer station are thus restored to their original condition, in readiness to repeat their above-described operation for the next pallet which arrives at the transfer station.

The pallet departing from the transfer station is next stopped at the unloading station by the stop 372, the solenoid S10 normally being de-energized. Upon the arrival of a loaded pallet at the unloading station, the detent 68 on the pallet depresses microswitch MS9, closing a circuit including coil K3 which becomes energized and causes contactors K3A and K3B to close. When the last is lifted off the pallet, releasing microswitch MS9, there is closed a circuit including contactor K3A and solenoid S10 which now is energized and causes the retraction of the stop 372 from the pallet, whereby the latter is freed for movement along the conveyor toward the loading hold-back station. As the pallet leaves the unloading station, it momentarily depresses microswitch MS10, causing coil K3 to become de-energized and contactors K3A, K3B to be opened. Consequently, with the opening of the circuit including contactor K3A and solenoid S10, the solenoid is de-energized and the stop 372 returns to its operative position in readiness to stop the next pallet at the unloading station.

Pallets will ordinarily be loaded frequently enough at the loading station to insure a supply of at least one loaded pallet, at all times, at the transfer hold-back station, and usually there will be one loaded pallet, at least, behind that detained at the latter station. Any pallet, upon approaching a stationary pallet ahead of it, is disconnected from the chain 26 soon after the arm 74 engages the slope 94 of the pallet ahead.

Similarly, if at the unloading station the operator, because of the time required for performing hand operations upon the shoes, unloads the pallets at a rate below the output of the machine 16 the loaded pallets will accumulate on the portions of the rails 20, 22 between the unloading station and the transfer station. Accordingly, a temporary slow down in unloading will not affect the output of the machine 16. However, when the last available space just beyond the transfer station will have been filled, the pallet on the transfer mechanism will be prevented, by engagement with the pallet immediately ahead of it, from moving far enough out of the transfer station to depress the microswitch MS8. Under these circumstances, the stop 96 will not be retracted to release another pallet for movement into the transfer station until the leading pallet at the unloading station will have been unloaded and room will have been made on the rails just beyond the transfer station fully to receive the pallet which is detained upon the transfer mechanism. Upon the movement of this pallet off the transfer mechanism, it depresses microswitch MS8 which causes the release of the leading pallet at the transfer hold-back station for movement into the transfer station and another cycle of operation of the transfer mechanism to be started.

There will be supplied for the illustrated apparatus a few pallets in excess of the minimum number required for insuring that the machine 16 will be operated at its maximum capacity. Accordingly, there will usually be an accumulation of empty pallets at the loading hold-back station and each pallet approaching this station from the unloading station will be stopped by its engagement with the last pallet of the group which is detained by the loading hold-back stop 374.

The control equipment also includes the above-mentioned switches AUX4, AUX5 and AUX6 for starting and stopping, individually, the pump motor PM, the welt butting and tacking machine motor WM and the conveyor motor CM, respectively. The power supply for all the above motors can be interrupted by operating any one of switches AUX1, AUX2 and AUX3 which are mounted upon the conveyor frame at the loading, transfer and unloading stations, respectively.

Another switch AUX7, in the circuit including the coil K7, may be operated manually at any time to open this circuit and de-energize the coil for purposes of retracting the slide 132 from the pallet, if it is desired to remove the pallet from the transfer mechanism.

Having thus described my invention, what I claim as new and desire to secure by Letters Patent of the United States is:

1. A shoemaking system comprising a machine for performing automatically an operation upon a shoe carried by a last, work handling apparatus for automatically presenting shoes to said machine, said apparatus comprising pallets for holding said lasts, a conveyor having a transfer station and mechanism comprising a carrier for transporting a shoe-bearing pallet from said transfer station into the operating station of said machine and back to said transfer station, said mechanism having connections for coupling said pallets to said carrier upon the movement of said pallets into said transfer station, control means operated by said connections for actuating said mechanism to advance a shoe-bearing pallet from said transfer station into said machine, control means for initiating a cycle of operation of said machine upon the arrival of the pallet at said machine, and control means operated at the end of said cycle for actuating said mechanism to return the pallet to said transfer station.

2. A shoemaking system comprising a machine for automatically performing an operation upon a shoe carried by a last, work handling apparatus comprising pallets upon which the lasts are fixed in a predetermined position, said apparatus also comprising a conveyor having a transfer station into and out of which said pallets are carried by said conveyor, mechanism to which a shoe-bearing pallet is coupled upon its movement into said transfer station for carrying said pallet into the operating station of said machine and back to said transfer station, control means operated in response to the coupling of the pallet upon said mechanism for actuating said mechanism to advance said pallet into said operating station, a second control means operated in response to said advancing movement of said pallet for initiating a cycle of operation of said machine, and a third control means operated upon the termination of the machine cycle for actuating said mechanism to return the pallet to said transfer station.

3. A shoemaking system comprising a machine for automatically performing an operation upon a shoe carried by a last, work handling apparatus comprising pallets for holding lasts carrying shoes to be operated upon and an endless conveyor along which the pallets are directed toward and away from a transfer station opposite to the machine, a transfer mechanism having coupling means for receiving each pallet upon its arrival at the transfer station, driving means operated in response to the coupling of a pallet to said transfer mechanism for operating said mechanism to carry the shoe-bearing pallet from the transfer station into operative relation to the machine, control means operated by the machine at the end of its cycle for actuating said transfer mechanism to return the shoe-bearing pallet to the transfer station, and control means operable upon the return of the shoe-bearing pallet to the transfer station for actuating said coupling means to release the pallet from said transfer mechanism for delivery from the transfer station.

4. In a shoemaking system comprising a machine for automatically performing an operation upon a shoe carried by a last and work handling apparatus for presenting to said machine shoes to be operated upon, said apparatus comprising pallets upon which the lasts are mounted in a predetermined position and a conveyor having a transfer station into and out of which the pallets are moved along the conveyor, transfer mechanism for carrying said pallets from said transfer station into operative relation to the machine and for returning them to said transfer station, said mechanism comprising coupling means for positioning and holding a pallet in a predetermined position upon said mechanism, control means operated by the pallet upon moving into said transfer station for actuating said coupling means, a second control means operated by said coupling means for actuating said transfer mechanism whereby the shoe is presented to said machine, said first-mentioned control means being operated by said pallet upon its return to said transfer station to actuate said coupling means to release the pallet from said transfer mechanism.

5. In a shoemaking system comprising a machine for automatically performing an operation upon a shoe carried by a last and work handling apparatus for presenting to said machine shoes to be operated upon, said apparatus comprising pallets upon which the lasts are mounted in a predetermined position and a conveyor having a transfer station into and out of which the pallets are moved along the conveyor, holdback means associated with said conveyor for stopping a pallet at said transfer station, transfer mechanism for carrying said pallets from said transfer station into operative relation to the machine and for returning them to said transfer station, said mechanism comprising coupling means for positioning and holding a pallet in a predetermined position upon said mechanism, control means operated by a pallet upon moving into said transfer station for actuating said coupling means, a second control means operated by said coupling means for actuating said transfer mechanism whereby the shoe on said last-mentioned pallet is presented to said machine, said first-mentioned control means being operated by said pallet upon its return to said transfer station to actuate said coupling means to release the pallet from said transfer mechanism and for simultaneously actuating said holdback means to release the pallet for delivery out of said transfer station.

6. A shoemaking system comprising a machine having operating tools for performing an operation upon a shoe carried by a last and driving means for imparting a cycle of operation to said tools, work handling apparatus for automatically carrying lasts having shoes thereon into and out of operative relation to said tools, said apparatus comprising pallets for carrying the lasts, a conveyor having a transfer station into and out of which last-bearing pallets are delivered along said conveyor in succession, transfer mechanism for receiving each pallet at said transfer station and operable to carry the pallet to said machine and back to said transfer station whereby a shoe is presented to said tools and is returned to said transfer station, control means operated by the flow of pallets into said transfer station for actuating said transfer mechanism to advance the pallet thereon into said machine, and a second control means operated by said transfer mechanism upon the presentation of the shoe to the machine for actuating said driving means, and a third control means operated by said driving means at the end of its cycle of operation to actuate said transfer mechanism to return the pallet thereon to said transfer station.

7. A shoemaking system comprising a machine for performing an operation upon a shoe carried by a last, work handling apparatus for automatically presenting shoes to said machine, said apparatus comprising pallets upon which the lasts are fixed in a predetermined position, a conveyor having a transfer station into and out of which said pallets are movable along said conveyor, and transfer mechanism comprising a carrier for transporting a shoe-bearing pallet from said transfer station into operative relation to said machine and back to said transfer station, said mechanism having connections for coupling said pallets to said carrier in a predetermined position upon the movement of said pallets into said transfer station, control means for actuating said mechanism to carry a shoe-bearing pallet from said transfer station into said machine, control means operated by said mechanism for initiating a cycle of operation of said machine, and control means operated at the end of said cycle for actuating said mechanism to return the pallet to said transfer station.

8. A shoemaking system comprising a machine for automatically performing an operation upon a shoe carried by a last, work handling apparatus for automatically presenting shoes to said machine, said apparatus comprising pallets having connections cooperating with the lasts to position the lasts on the pallets in a predetermined position, a conveyor having a transfer station and driving means for propelling pallets into and out of said station, transfer mechanism comprising a carrier for transporting shoe-bearing pallets from said transfer station into operative relation to said machine and back to said transfer station, said pallets and mechanism having coupling means for holding said pallets upon said carrier in a predetermined position, control means for actuating said transfer mechanism to cause the shoes to be presented to said machine, control means operated upon the presentation of a shoe to said machine for initiating a cycle of operation of said machine, and control means operated by said machine at the end of said cycle for actuating said transfer mechanism to return the pallets to said transfer station.

9. A shoemaking system comprising a machine for automatically performing an operation upon a shoe carried by a last, work handling apparatus for automatically presenting shoes to said machine, said apparatus comprising pallets upon which said lasts are mounted, a conveyor having a transfer station, and transfer mechanism for carrying a shoe-bearing pallet from said transfer station into operative relation to said machine and back to said transfer station, a stop for interrupting the advance of said pallets into said transfer station, said pallets and said mechanism having connections for coupling said pallets to said mechanism upon movement of said pallets into said transfer station, control means for actuating said mechanism to carry a shoe-bearing pallet from said transfer station into said machine, control means for initiating a cycle of operation of said machine, control means for actuating said mechanism to return the pallet thereon to said transfer station, and means actuated upon the departure of each pallet from said transfer station for operating said stop to release the succeeding pallet for movement into said transfer station.

10. A shoemaking system comprising a machine for automatically performing an operation upon a shoe presented thereto, work handling apparatus for automatically presenting to said machine shoes carried by lasts, said apparatus comprising pallets having elements cooperating with the lasts to position them upon the pallets in a predetermined position, a conveyor having a transfer station and driving means for propelling pallets into and out of said station, transfer mechanism for receiving shoe-bearing pallets at said transfer station, presenting the shoe in a predetermined path to said machine and returning it to said transfer station, holdback means for controlling the advance of pallets into said transfer station, control means for initiating a cycle of operation of said transfer mechanism, and control means for actuating said holdback means to admit a pallet to said transfer station in response to the delivery of each pallet from said transfer station.

11. A shoemaking system comprising a machine for automatically performing an operation upon a shoe presented thereto, work handling apparatus for automatically carrying lasts having shoes thereon into and out of operative relation to said machine, said apparatus comprising pallets upon which the lasts are mounted, a conveyor having a transfer station and driving means for propelling pallets toward and away from said station, holdback means for controlling the admission of pallets to said transfer station, transfer mechanism for receiving said pallets at said transfer station, carrying them into operative relation to said machine and returning them to said transfer station, control means operated by said pallets upon their arrival at said transfer station for initiating a cycle of operation of said transfer mechanism, and a second control means operated by each pallet upon its departure from said transfer station for actuating said holdback means to admit another pallet to said transfer station.

12. A shoemaking system comprising a machine for automatically performing an operation upon a shoe carried by a last upon the presentation of the shoe to the machine, work handling apparatus for automatically presenting shoes to said machine, said apparatus comprising pallets having connections cooperating with the lasts to locate them upon the pallets in a predetermined position, a conveyor having a transfer station and driving means for propelling pallets into and out of said station, transfer mechanism for carrying shoe-bearing pallets in a predetermined path from said transfer station into operative relation to said machine and back to said transfer station, said pallets and mechanism having coupling means for holding said pallets upon said mechanism with the shoe in a predetermined relation to said path, holdback means for controlling the advance of pallets into said transfer station, control means for initiating a cycle of operation of said transfer mechanism, and control means for actuating said holdback means to admit a pallet to said transfer station upon the delivery of each pallet from said transfer station.

13. A shoemaking system comprising a machine for automatically performing an operation upon a shoe presented thereto, work handling apparatus for automatically presenting to said machine shoes carried by lasts, said apparatus comprising pallets having connections cooperating with the lasts to position them on the pallets in a predetermined position, a conveyor having a transfer station and driving means for propelling pallets into and out of said station, transfer mechanism for carrying shoe-bearing pallets in a predetermined path from said transfer station into operative relation to said machine and back to said transfer station, said pallets and mechanism having coupling means for holding said pallets upon said mechanism with the shoe in a predetermined relation to said path, holdback means for controlling the advance of pallets into said transfer station, means actuated by each pallet upon its arrival at said transfer station for successively operating said coupling means and initiating a cycle of operation of said transfer mechanism, and control means operated in response to the delivery of each pallet from said transfer station for actuating said holdback means to admit another pallet to said transfer station.

14. A shoemaking system comprising a machine for automatically performing an operation upon a shoe presented thereto, work handling apparatus for automatically presenting to said machine shoes carried by lasts, said apparatus comprising pallets having members thereon cooperating with the lasts to position them on the pallets in a predetermined position, a conveyor having a loading station, a transfer station and driving means for propelling pallets from said loading station into and out of said transfer station and back to said loading station, transfer mechanism for carrying shoe-bearing pallets in a predetermined path from said transfer station into operative relation to said machine and back to said transfer station, said pallets and said mechanism having coupling means for holding said pallets upon said mechanism with the shoe in a predetermined position with respect to said path, stop means for releasing a loaded pallet from said loading station and for holding the succeeding pallet therein, control means operated in response to the loading of a last upon the pallet at said loading station for actuating said stop means, holdback means for controlling the admission of pallets to said transfer station, means actuated by a pallet upon its arrival at said transfer station for successively operating said coupling means and initiating a cycle of operation of said transfer mechanism, and other control means operated in response to the delivery of each pallet from said transfer station for actuating said holdback means to admit another pallet to said transfer station.

15. A shoemaking system comprising a machine for automatically performing an operation upon a shoe carried by a last, work handling apparatus comprising pallets for holding lasts, a conveyor having a loading station and opposite to said machine a transfer station, said conveyor comprising means for driving said pallets from said loading station into and out of said transfer station and back to said loading station, a transfer mechanism for receiving a pallet at said transfer station, presenting it to said machine and returning it to said transfer station, said transfer mechanism comprising coupling means for positioning and holding the pallet on said transfer mechanism in a predetermined position, each of said pallets having a tell-tale member which is displaced from an inoperative position into an operative position by a last which is completely assembled upon the pallet, a stop associated with said conveyor at said loading station for holding a pallet at said station, control means operated by said tell-tale member when a last is assembled upon the pallet at said loading station for retracting said stop whereby the pallet at said loading station is released for movement into said transfer station, a holdback stop associated with said transfer station for interrupting the advance of pallets into said station, said holdback stop normally being retracted into an inoperative position, a second control means operated by a pallet approaching said transfer station for setting said holdback stop in its operative position, a third control means operated prior to the arrival of a pallet at said transfer station for actuating said coupling means, and another control means operated by said coupling means and cooperating with said tell-tale for initiating a cycle of operation of said transfer mechanism, said second control means being operated in response to the departure of the pallet from said transfer station to return said holdback stop to its inoperative position whereby the pallet holding the shoe next to be operated upon is released for movement into said transfer station.

16. A shoemaking system comprising a machine for automatically performing an operation upon a shoe carried by a last, work handling apparatus comprising pallets for holding lasts, an endless conveyor along which said pallets are directed toward and away from said machine, said conveyor having a loading station and opposite to said machine a transfer station, means for driving pallets along said conveyor from said loading station into and out of said transfer station and back to said loading station, a transfer mechanism for receiving loaded pallets at said transfer station, presenting them to said machine for the performance of an operation upon the shoe and returning them to said transfer station, a stop associated with said conveyor for interrupting the advance of pallets out of said loading station, and control means actuated by the loading of a last upon the pallet at said loading station for operating said stop to release the loaded pallet for movement toward said transfer station, said control means being actuated by the departure of the loaded pallet from said loading station for resetting said stop whereby the advance of the succeeding pallet is interrupted at said loading station.

17. A shoemaking system comprising a machine for automatically performing an operation upon a shoe carried by a last, work handling apparatus comprising pallets for holding lasts, an endless conveyor along which said pallets are directed toward and away from said machine, said conveyor having a loading station and opposite to said machine a transfer station, means for driving pallets along said conveyor from said loading station into and out of said transfer station and back to said loading station, a transfer mechanism for receiving loaded pallets at said transfer station, presenting them to said machine for the performance of an operation upon the shoe and returning them to said transfer station, control means comprising a stop normally biased within the path of the pallets to prevent their passage through the loading station and movable into an inoperative position to free the loaded pallet at said loading station for movement away therefrom, said control means comprising a switch operated in response to the loading of the leading pallet at the loading station for causing the retraction of said stop into its inoperative position, and a second switch operated by the loaded pallet as it departs from the loading station for causing the release of said stop and its return to its operative position in advance of the arrival of the succeeding pallet at the loading station.

18. A shoemaking system comprising a machine for automatically performing an operation upon a shoe carried by a last, work handling apparatus comprising pallets for holding lasts, connections on said pallets and lasts for permitting the complete loading of a last upon a pallet in one position only, each of said pallets having a tell-tale which is displaced by fully loading a last upon the pallet, an endless conveyor for said pallets having a loading station and opposite to said machine a transfer station, said conveyor comprising driving means for propelling said pallets from said loading station into and out of said transfer station and back to said loading station, a transfer mechanism for receiving a loaded pallet at said transfer station, presenting it to said machine for the performance of an operation upon the shoe and returning it to said transfer station, a stop associated with said conveyor for controlling the advance of pallets out of said loading station, and control means comprising a switch actuated by the tell-tale of that pallet in said loading station in response to the loading of a last upon that pallet for operating said stop to release the loaded pallet from said loading station, and a second switch operated by the loaded pallet upon its departure from said loading station for actuating said control means to reset said stop whereby the advance of the succeeding pallet is interrupted at said loading station.

19. A shoemaking system comprising a machine for automatically performing an operation upon a shoe carried by a last, work handling apparatus comprising pallets for holding lasts, an endless conveyor for said pallets having a loading station and opposite to said machine a transfer station, said conveyor comprising driving means for propelling pallets from said loading station into and out of said transfer station and back to said loading station, a transfer mechanism for receiving a loaded pallet at said transfer station, presenting it to said machine and returning it to said transfer station, stops associated with said conveyor for preventing the advance of pallets into and out of said loading and transfer stations, and control means actuated by the departure of pallets from said stations for operating said stops to admit a pallet to said stations for each pallet departing therefrom.

20. A shoemaking system comprising a machine for automatically performing a shoemaking operation upon shoes on lasts, work handling apparatus comprising pallets for holding the lasts and mechanism for carrying pallets from a loading station to said machine to present the shoe to the machine for the performance of a shoemaking operation thereupon and for returning the pallet to the loading station, said mechanism including a holdback means for interrupting the advance of pallets into said loading station and a second holdback means for interrupting the advance of pallets into said machine, means actuated by the loading of a last upon the leading pallet at the loading station for releasing said leading pallet from said loading station for movement toward said machine, control means operated in response to the departure of the loaded pallet from said loading station for operating said first-mentioned holdback means to permit the advance of the leading pallet detained thereby to the loading station, and other control means operated in response to the departure of each pallet from said machine for operating said second holdback means to permit the advance of the succeeding pallet to said machine.

21. A shoemaking system comprising a machine for automatically performing an operation upon a shoe carried by a last, work handling apparatus comprising pallets for holding lasts, a transfer mechanism movable away from and back to a transfer station to present a loaded pallet to said machine and return it to said transfer station, said transfer mechanism and each pallet having connections for coupling a pallet to said mechanism at said transfer station, an endless conveyor leading to and away from said transfer station, means for driving said pallets along said conveyor, control means actuated in response to the departure of a pallet from said transfer station for admitting the succeeding pallet on said conveyor to said transfer station, and a loading station associated with said conveyor comprising control means actuated by the loading of a last upon the leading pallet at said loading station for releasing the leading pallet for advance along said conveyor to said transfer station, said last-named control means being actuated by the leading pallet upon its departure from said loading station for stopping the succeeding pallet at said loading station.

22. In a shoemaking system, work handling apparatus comprising pallets for holding lasts, each pallet comprising a tell-tale which is displaced into an operative position by the assembling of a last thereupon, a machine for automatically performing an operation upon shoes carried by the lasts, said apparatus comprising an endless conveyor along which said pallets are carried toward and away from said machine, a loading station associated with said conveyor and having a stop normally biased within the path of the pallets to interrupt their advance toward said machine, driving means associated with said conveyor for propelling said pallets from said loading station to said machine and thence back to said loading station, and control means actuated successively by said tell-tale upon the loading of the leading pallet at said loading station and by the loaded pallet upon its departure from said loading station for withdrawing said stop out of the path of said loaded pallet and releasing said stop for return movement into its operative position in advance of the arrival of the succeeding pallet at said loading station.

23. In a shoemaking system, work handling apparatus comprising pallets for holding lasts, a machine for automatically performing an operation upon a shoe carried by a last, said apparatus comprising an endless conveyor having a loading station from which said pallets are driven toward and away from said machine, said loading station having associated therewith a stop for normally interrupting the advance of pallets toward said machine, control means actuated by the loading of a last upon the leading pallet at said loading station for operating said stop to release the loaded pallet for movement toward said machine, a holdback stop for normally interrupting the advance into said loading station of the pallets discharged from said machine, and a second control means actuated by each pallet upon its departure from said loading station for operating said holdback stop to release one pallet for movement into said loading station for each pallet departing from said loading station.

24. In a shoemaking system, work handling apparatus comprising pallets for holding lasts, each pallet comprising a tell-tail which is displaced into an operative position by the assembling of a last thereupon, a machine for automatically performing an operation upon shoes carried by the lasts, said apparatus comprising a loading station, an endless conveyor along which said pallets are driven from said loading station toward and away from said machine and back to said loading station, a stop associated with said loading station and normally biased within the path of the pallets to interrupt their advance toward said machine, a holdback stop for interrupting the advance of pallets into said loading station, control means actuated by said tell-tale upon the loading of the leading pallet at said loading station for operating said first-mentioned stop to release the loaded pallet for movement toward said machine, and a second control means actuated by the loaded pallet upon its departure from said loading station for operating said holdback stop to release the pallet behind it for movement toward said loading station.

25. A shoemaking system comprising a machine for performing an operation upon a shoe carried by a last, work handling apparatus for presenting shoes to said machine, said apparatus comprising pallets for holding the lasts, an endless conveyor along which said pallets are driven toward and away from said machine, said conveyor having a loading station comprising a stop for interrupting the movement of pallets toward said machine and a loading holdback station comprising a stop for controlling the movement of pallets to said loading station, control means for retracting said loading station stop to release the leading pallet at said loading station for movement toward said machine, each of said pallets having a tell-tale operable in response to the assembling of a last upon the leading pallet at the loading station to actuate said control means, and a second control means operated upon the departure of each shoe-bearing pallet from said loading station to retract said loading holdback stop whereby a pallet is released for movement from said holdback station to said loading station for each pallet departing from said loading station.

26. A shoemaking system comprising a machine for performing an operation upon a shoe carried by a last, work handling apparatus for automatically presenting shoes to said machine, said apparatus comprising pallets for holding lasts, an endless conveyor having a transfer station into and out of which said pallets are directed upon said conveyor, means for driving said pallets along said conveyor, a loading station associated with said conveyor and having a stop for normally interrupting the advance of pallets along said conveyor, control means actuated by the assembling of a last upon the leading pallet at said loading station for operating said stop to release said leading pallet for movement into said transfer station, transfer mechanism for receiving a loaded pallet at said transfer station, carrying in into operative relation to said machine and returning it to said transfer station into the path of said driving means whereby the advance of said pallet along said conveyor is continued toward said loading station, a holdback stop for normally interrupting the advance into said loading station of pallets discharged from said machine, and a second control means actuated by each pallet upon its departure from said loading station for operating said holdback stop to release the succeeding pallet for movement into said loading station.

27. A shoemaking system comprising a machine for automatically performing an operation upon a shoe carried by a last, work handling apparatus for automatically presenting shoes to said machine, said apparatus comprising pallets upon which the lasts are mounted, a conveyor having a transfer station into and out of which said pallets are movable along said conveyor, driving means for advancing said pallets along said conveyor, transfer mechanism to which a pallet is coupled upon its arrival at said transfer station, said mechanism being operable to carry the loaded pallet from said transfer station into operative relation to said machine and to return it to said transfer station, means for positioning the pallet at said transfer station upon said mechanism transversely of the direction of movement of said mechanism and for clamping the pallet on said mechanism, control means operated by the pallets upon their arrival at the transfer station for actuating said positioning and clamping means, and connections operated by said positioning and clamping means for actuating said transfer mechanism.

28. A shoemaking system comprising a machine for automatically performing an operation upon a shoe carried by a last, work handling apparatus for automatically presenting shoes to said machine, said apparatus comprising pallets upon which the lasts are mounted, a conveyor having a transfer station into and out of which said pallets are movable along said conveyor, driving means for advancing said pallets along said conveyor, transfer mechanism to which a pallet is coupled upon its arrival at said transfer station, said mechanism being operable to advance the loaded pallet from said transfer station into operative relation to said machine and to return it to said transfer station, means for positioning and clamping the pallet upon said mechanism in a predetermined position lengthwise of said conveyor, control means operated by a pallet upon its entry into said transfer station for actuating said positioning and clamping means, and other control means operated by said positioning and clamping means for initiating a cycle of operation of said mechanism.

29. A shoemaking system comprising a machine for automatically performing an operation upon a shoe carried by a last, work handling apparatus for automatically presenting shoes to said machine, said apparatus comprising pallets upon which the lasts are mounted, a conveyor having a transfer station into and out of which said pallets are movable along said conveyor, driving means for advancing said pallets along said conveyor, transfer mechanism to which a pallet is coupled upon its arrival at said transfer station, stop means for disengaging said pallets from said driving means and positioning them at the transfer station, said mechanism being operable to carry the pallet at the transfer station into operative relation to said machine and to return it to said transfer station, said mechanism comprising means for positioning and clamping the pallet thereon, control means operated by the pallets upon their arrival at the transfer station for actuating said last-mentioned positioning and clamping means, and connections operated in response to movement of said positioning and clamping means for actuating said mechanism.

30. A shoemaking system comprising a machine for automatically performing an operation upon a shoe carried by a last, work handling apparatus for automatically presenting shoes to said machine, said apparatus comprising pallets upon which said lasts are mounted, a conveyor having a transfer station into and out of which said pallets are movable along said conveyor, transfer mechanism for carrying a loaded pallet from said transfer station into operative relation to said machine and back to said transfer station, driving means for advancing said pallets along said conveyor, each of said pallets having a driving member mounted thereon for movement into and out of driving engagement with said driving means, stop means associated with said conveyor for disengaging from said driving means the driving member of a pallet entering said transfer station and stopping the pallet at said transfer station, said pallets and said mechanism having connections for coupling said pallets to said mechanism upon movement of said pallets into said transfer station, means for actuating said transfer mechanism to carry the loaded pallet thereon into said machine, means for initiating a cycle of said machine, means for actuating said mechanism at the end of said cycle to return the pallet to said transfer station, and means for retracting said stop means from said driving member whereby the latter is reengaged with said driving means and said pallet is discharged from said transfer station along said conveyor.

31. A shoemaking system comprising a machine for automatically performing an operation upon a shoe carried by a last, work handling apparatus for automatically presenting shoes to said machine, said apparatus comprising pallets upon which said lasts are mounted, a conveyor having a transfer station into and out of which said pallets are movable along said conveyor, transfer mechanism for carrying a loaded pallet from said transfer station into operative relation to said machine and back to said transfer station, driving means for advancing said pallets along said conveyor, each of said pallets having a driving member mounted thereon for movement into and out of driving engagement with said driving means, stop means for disengaging from said driving means the driving member of a pallet entering said transfer station and for positioning the pallet at said transfer station, means associated with said mechanism for clamping thereon the pallet at said transfer station, control means operated by said clamping means for actuating said transfer mechanism to advance the pallet into operative relation to said machine, means for initiating a cycle of operation of said machine in response to the advancing movement of said mechanism, means for actuating said mechanism to return the pallet to said transfer station upon the termination of said cycle, and means for simultaneously actuating said clamping means to release the pallet and retracting said stop means from said driving member whereby the latter is re-engaged with said driving means and the pallet is delivered from the transfer station along said conveyor.

32. A shoemaking system comprising a machine for performing an operation upon shoes carried by lasts, work handling apparatus for automatically presenting shoes to said machine, said apparatus comprising pallets upon which said lasts are mounted, each of said pallets having a tell-tale member which is displaced into an operative position by a last mounted upon the pallet, a conveyor having a transfer station into and out of which said pallets are movable along said conveyor, transfer mechanism for carrying a shoe to be operated upon from said transfer station into operative relation to said machine, said pallets and transfer mechanism having connections for coupling the pallets to said mechanism upon movement of the pallets into said transfer station, and control means cooperating with said tell-tale member and actuated by said connections for initiating a cycle of operation of said transfer mechanism.

33. In a shoemaking system comprising a machine for automatically performing an operation upon a shoe carried by a last and work handling apparatus for presenting to said machine shoes to be operated upon, said apparatus comprising pallets upon which the lasts are mounted in a predetermined position and a conveyor having a transfer station into and out of which the pallets are moved along said conveyor, each of said pallets having a tell-tale member which is displaced into an operative position by a last mounted upon the pallet, transfer mechanism for carrying a shoe-bearing pallet from said transfer station into operative relation to said machine, said mechanism comprising coupling means for receiving and holding each pallet upon its arrival at said transfer station, control means operated by the pallet upon its arrival at said transfer station for actuating said coupling means, a second control means for actuating said transfer mechanism, and connections activated by said tell-tale member and operated by said coupling means for operating said second control means.

34. A shoemaking system comprising a machine for performing an operation upon a shoe carried by a last, work handling apparatus for automatically presenting shoes to said machine, said apparatus comprising pallets upon which said lasts are mounted, each of said pallets having a tell-tale member which is displaced into an operative position by a last mounted upon the pallet, a conveyor having a transfer station into and out of which said pallets are movable along said conveyor, transfer mechanism for advancing a shoe to be operated upon from said transfer station into operative relation to said machine, said pallets and transfer mechanism having coupling means comprising a slide carried by said mechanism for gripping a pallet thereon at said transfer station, and control means for initiating a cycle of operation of said transfer mechanism comprising connections operated in response to movement of said slide upon the engagement of said connections with said tell-tale.

35. A shoemaking system comprising a machine for performing an operation upon shoes carried by lasts, work handling apparatus for automatically presenting shoes to said machine, said apparatus comprising pallets upon which said lasts are mounted, each of said pallets having a tell-tale member which is displaced into an operative position by a last mounted upon the pallet, a conveyor having a transfer station into and out of which said pallets are movable along said conveyor, transfer mechanism for advancing a shoe to be operated upon from said transfer station into operative relation to said machine, said pallets and transfer mechanism having coupling means comprising a slide carried by said mechanism for coupling a pallet thereto at said transfer station, and control means for initiating a cycle of operation of said transfer mechanism, said control means comprising a switch and connections operated by said slide in cooperation with said tell-tale member for operating said switch.

36. In a shoemaking system, work handling apparatus comprising pallets for holding shoes to be operated upon, a conveyor comprising a runway for supporting said pallets and means associated with said runway for propelling said pallets along it, each of said pallets having a driving device comprising an arm carrying a hook adapted to be engaged by said propelling means, said arm being movable to carry said hook transversely of the path of said propelling means into and out of a driving position within said path, said hook being mounted for movement upon said arm out of said position along and then out of said path, and means for biasing said hook oppositely to the movement of said propelling means into said position.

37. In a shoemaking system, work handling apparatus comprising pallets for holding shoes to be operated upon, a conveyor comprising a runway for supporting said pallets and means associated with said runway for propelling said pallets along it, each of said pallets having a driving device comprising a member disposed normally in an operative position in the path of said propelling means and mounted to swing transversely of the path of said propelling means out of said position, and means for yieldingly holding said member in its operative position, said member also being mounted for movement along the path of said propelling means in response to driving pressure exerted upon said member in excess of a predetermined amount.

38. In a machine of the class described having operating tools for performing a shoemaking operation upon a shoe on a last, supporting means for holding said last, means for imparting advancing and retractive movements to said supporting means to carry the shoe into and out of operative relation to the operating tools, respectively, means for registering the size of the shoe during its advancing movement, and mechanism cooperating with said registering means to adjust said operating tools according to the size of the shoe to be presented thereto.

39. In a machine of the class described having operating tools for performing a shoemaking operation upon a shoe on a last, supporting means for holding said last, means for imparting advancing and retractive movements to said supporting means to carry the shoe into and out of operative relation to the operating tools, respectively, means operated in response to advancing movement of said supporting means for registering the size of the shoe, and mechanism for adjusting said operating tools to receive shoes of different sizes, said mechanism being constructed and arranged to cooperate with said registering means to set said operating tools according to the size of the shoe in response to further advancing movement of said supporting means.

40. In a machine of the class described, operating tools for performing a shoemaking operation upon a shoe on a last, mechanism for adjusting said tools for varying sizes of work, and supporting means for the last movable in a predetermined path to carry the shoe into and out of operative relation to said tools, said supporting means comprising a member which is positioned by the last in accordance with the size thereof, said mechanism being disposed in the path of and driven by said member to set said tools according to the size of the last in response to the operation of said supporting means.

41. In a machine of the class described having operating tools for performing a shoemaking operation upon a shoe on a last, mechanism for adjusting said tools in accordance with the size of the shoe which is presented thereto, and supporting means for the last mounted for movement to carry the shoe into and out of operative relation to said tools, said supporting means comprising an abutment and opposite thereto a yieldingly mounted support for holding the shoe against said abutment, said abutment being movable toward said support into a predetermined position whereby said support is displaced into a size registering position according to the dimension of the last extending between said support and abutment, said support also being movable into and out of driving engagement with said mechanism in response to advancing movement of said supporting means toward said tools whereby said tools are adjusted according to the size of the shoe.

42. In a machine of the class described having operating tools for performing a shoemaking operation upon a shoe on a last, said tools being mounted for adjustment toward and away from each other to receive shoes of varying sizes, mechanism for adjusting said tools in accordance with the size of the shoe which is presented thereto, supporting means for the last mounted for movement to carry the shoe into and out of operative relation to said tools, said supporting means comprising a yieldingly mounted member, size registering means acting upon the shoe in response to the movement thereof toward said tools to displace said yielding member into a size registering position according to the size of the last, and connections operated by said member during its movement toward said tools for driving said mechanism whereby said tools are adjusted according to the size of the shoe.

43. In a machine of the class described having operating tools for performing a shoemaking operation upon a shoe on a last, mechanism for adjusting said tools toward and away from each other to accommodate shoes of varying sizes, supporting means for the last mounted for movement to carry the shoe into operative relation to said tools, said supporting means comprising an abutment for positioning the shoe in a size registering position, said supporting means also comprising a yieldingly mounted last carrying member for urging said shoe into contact with said abutment whereby said member is located in a size registering position according to the size of the shoe, means for locking said member in said size registering position during a portion of said movement, and connections engaged by said member while it is locked for driving said mechanism whereby said tools are adjusted according to the size of the shoe presented thereto.

44. In a machine of the class described having spaced operating tools for performing a shoemaking operation upon a shoe on a last, mechanism for adjusting said tools toward and away from each other to accommodate shoes of varying sizes, supporting means for the last comprising a carriage mounted for movement to carry the shoe into operative relation to said tools, said means also comprising a member mounted upon said carriage for movement heightwise of the last into a size registering position, size registering means comprising an arm mounted for movement into engagement with the shoe for displacing said member into its size registering position, and connections cooperating with said member and said mechanism for adjusting said tools according to the size of the shoe presented thereto.

45. In a machine of the class described having spaced tool heads between which a shoe on a last is presented for the performance of an operation on the shoe, said heads being mounted for adjustment toward and away from each other laterally of the shoe, means for presenting the shoe to said tool heads mounted for movement toward and away from said heads, said means comprising a supporting member mounted for yielding movement heightwise of the last, size registering means comprising a member movable into engagement with the shoe bottom through a predetermined stroke whereby said supporting member is displaced into a size registering position according to the size of the last, mechanism for adjusting said tool heads, and connections cooperating with said supporting member in its size registering position for driving said mechanism whereby said tool heads are adjusted according to the size of the shoe presented thereto.

46. In a machine of the class described having operating tools for performing a shoemaking operation upon a shoe on a last, means for presenting a shoe to said operating tools comprising last supporting means which is mounted for movement in one path toward and away from said tools and in a second path toward and away from a size registering position, size registering means comprising a member for moving the shoe by engagement with its bottom into its size registering position, clamping means for holding said last supporting means in its size registering position, operating means for each of said size registering members and said clamping means, said means being operable in succession in response to advancing movement of said last supporting member toward said tools, mechanism for adjusting said tools, and connections between said last supporting means and said mechanism for driving said mechanism in response to further advancing movement of said last supporting means whereby said operating tools are adjusted according to the size of the shoe.

47. In a machine of the class described having operating tools for performing an operation upon a shoe on a last, work supporting means for presenting a shoe to said operating tools comprising a jack post yieldingly mounted upon a carriage which is movable in a predetermined path toward and away from said tools, size registering means comprising a member operable through a predetermined stroke into engagement with the shoe to displace said jack post into a size registering position, means for clamping said jack post in its size registering position to said carriage, mechanism for adjusting said operating tools to receive shoes of different sizes, and connections between said jack post and said mechanism for driving said mechanism in response to advancing movement of said supporting means whereby said operating tools are positioned according to the size of the shoe to be presented thereto.

48. In a machine of the class described having operating tools for performing a shoemaking operation upon a shoe on a last, mechanism for adjusting said tools in accordance with the size of the work to be operated upon, supporting means for the last mounted for movement to carry the shoe into operative relation to said tools through a size registering position, said supporting means comprising a member for controlling said mechanism, means for positioning said member in accordance with the size of the last while it is in said size registering position, and means for successively locking said member while the last is in said size registering position and for releasing said member after said mechanism has been operated to adjust said tools, said member and mechanism being arranged to cooperate while said member is locked to set said tools according to the size of the last and shoe presented thereto.

49. In a machine of the class described having spaced tool heads between which a shoe on a last is presented for the performance of an operation upon the shoe, said heads being mounted for adjustment toward and away from each other to receive shoes of different sizes, supporting means for holding the last, means for imparting advancing and retractive movements to said supporting means to carry the shoe into and out of operative relation to said heads respectively, means carried by said supporting means for registering the size of the shoe during its advancing movement, and mechanism cooperating with said registering means to position said heads toward and away from each other according to the size of the shoe which is presented therebetween.

50. In a machine of the class described having spaced tool heads between which a shoe on a last is presented for the performance of an operation upon the shoe, said heads being mounted for adjustment toward and away from each other to receive shoes of different sizes, supporting means for holding the last, said means comprising a carriage mounted for movement in a predetermined path toward and away from said heads, means for imparting advancing and retractive movements to said carriage to carry the shoe into and out of operative relation to said heads respectively, said supporting means also comprising a member mounted for movement upon said carriage into a size registering position according to the size of the shoe, size registering means operated by advancing movement of said supporting means into engagement with the shoe for displacing said member into its size registering position, mechanism for adjusting said heads, and connections driven by said member in response to advancing movement of said supporting means for operating said mechanism to position said heads toward and away from each other in accordance with the size of the shoe.

51. In a machine of the class described having spaced tool heads between which a shoe on a last is presented for the performance of an operation upon the shoe, said heads being mounted for adjustment toward and away from each other to receive shoes of different sizes, supporting means for holding the last, means for imparting advancing and retractive movements to said supporting means to carry the shoe into and out of operative relation to said heads respectively, said supporting means comprising a member yieldingly mounted upon a carriage which is movable in a predetermined path toward and away from said heads, size registering means for positioning said member relatively to said carriage in accordance with the size of the shoe, mechanism for adjusting said heads, and connections cooperating with said member and said mechanism during the advancing movement of said supporting means to position said heads toward and away from each other according to the size of the shoe presented therebetween.

52. In a machine of the class described having operating tools for performing a shoemaking operation upon a shoe on a last, means for presenting a shoe on a last to said tools by advancing the shoe lengthwise and heightwise thereof successively into operative relation to said tools, a work rest associated with said tools for limiting the said heightwise movement of said shoe by engagement with the shoe bottom, said means comprising a support mounted for yielding movement heightwise of the last to hold the shoe against said rest, means for registering the height of the heel part of the last, mechanism cooperating with said registering means for adjusting said tools laterally of the shoe in accordance with the height of the heel part of the last, and stop means comprising a member positioned by said yielding support for limiting the advancing movement of the shoe lengthwise thereof in accordance with the height of the heel part of the last.

53. In a machine of the class described having adjustable operating tools for performing an operation upon a shoe on a last and a work rest for positioning a shoe heightwise thereof with respect to said tools by engagement with the shoe bottom, supporting means for the last mounted for advancing movement toward and return movement away from said tools to carry the shoe into and out of operative relation thereto, said supporting means comprising a yieldingly mounted member for biasing the bottom of the shoe into engagement with said work rest when the shoe is presented to said tools, size registering means for successively depressing the shoe and said member during said advancing movement into size registering position and releasing the shoe at the end of said advancing movement for movement into engagement with said work rest, means operated by said member during said advancing movement for adjusting said operating tools in accordance with the size registering position of said member, and stop means associated with said member for limiting said advancing movement in accordance with the level of said member with respect to said work rest as determined by the engagement of the shoe bottom with said work rest.

54. In a machine of the class described having adjustable operating tools for performing a shoemaking operation upon a shoe on a last and a work rest for positioning a shoe heightwise thereof with respect to said tools by engagement with the shoe bottom, a jack for presenting the shoe to said machine, said jack being movable through a tool setting range and beyond said range to bring the shoe into operative relation to said tools, said jack comprising a member movable heightwise of the shoe in engagement with the bottom thereof through a predetermined stroke to move said jack into a size registering position during its tool setting range of movement, means for clamping said jack in its size registering position, means operated in response to movement of said jack within said range for setting said operating tools according to the size registering position of said jack, said member being movable away from the shoe in response to movement of the shoe beyond said range to permit the shoe bottom to become seated upon said work rest, and means cooperating with said jack for limiting its movement toward said machine in accordance with the position of the jack heightwise of the shoe determined by the engagement of the shoe bottom with said work rest.

55. In a machine of the class described having operating tools for performing a shoemaking operation upon a shoe on a last, means for presenting a shoe on a last to said tools by advancing the shoe parallel to its bottom and heightwise thereof successively into operative relation to said tools, means operable during the advancing movement of the shoe for registering the height of the heel part of the last, mechanism operated in response to further advancing movement of the shoe and under the control of said registering means for adjusting said tools laterally of the shoe in accordance with the height of the heel part of the last, a work rest associated with said tools for positioning the shoe by engagement with the bottom thereof at the end of its heightwise movement, and means for limiting the advancing movement of the shoe parallel to its bottom comprising cooperating stops one of which is fixed and the other of which is positioned by said first-mentioned means upon movement of the shoe into engagement with said work rest.

56. In a machine of the class described having operating tools for performing a shoemaking operation upon a shoe on a last, means comprising a pallet carrying a last for presenting the shoe to said tools by advancing it lengthwise and heightwise thereof successively into operative relation to said tools, an abutment associated with said tools for limiting the said heightwise movement of said shoe by engagement with the shoe bottom, said means also comprising a yieldingly mounted support for and acting upon said pallet to hold the shoe against said abutment, means for registering the height of the heel part of the last, mechanism controlled by said registering means for adjusting said tools in accordance with the said heel part height, and means for limiting the advancing movement of the shoe lengthwise thereof in accordance with the said heel part height comprising cooperating stops one of which is positioned by said support.

57. In a machine of the class described having operating tools for performing a shoemaking operation upon a shoe on a last, said tools being mounted for adjustment to accommodate shoes of different sizes, means for presenting a shoe on a last in operative relation to said tools by movements directed lengthwise and heightwise of the last in succession, a work rest associated with said tools for positioning the shoe heightwise thereof by engagement with the shoe bottom, said means comprising a yieldingly mounted support for urging the last heightwise thereof to hold the shoe against said work rest whereby said support is positioned according to the height of the heel part, means for registering the height of the heel part of the last, mechanism cooperating with said registering means in response to the movement of the shoe lengthwise thereof for adjusting said operating tools in accordance with the registered height of the heel part of the last, and stop means for limiting the advancing movement of the shoe lengthwise thereof in accordance with the height of the heel part, said means comprising a stop member which is positioned by said support upon the termination of the said heightwise movement of the shoe into engagement with said work rest.

58. In a machine of the class described having spaced operating tools for performing a shoemaking operation upon a shoe on a last presented therebetween, mechanism for adjusting said tools toward and away from each other to receive shoes of different sizes, an abutment associated with said tools for positioning the shoe heightwise thereof by engagement with the shoe bottom, supporting means for the last mounted for advancing movement toward and retractive movement away from said trols to carry the shoe into and out of operative relation thereto, said supporting means comprising a member mounted for yielding movement into a size registering position in which the shoe bottom is at a level different from that of said abutment, size registering means for displacing said member into its size registering position according to the size of the shoe, means for successively clamping said member in its size registering position and releasing said member before the arrival of the shoe at its operative position with respect to said tools whereby the shoe is positioned heightwise with respect to said tools by engagement with said abutment, connections positioned by said member in response to its advancing movement for operating said mechanism to adjust said tools, and means associated with said member for variably limiting the advancing movement of the shoe into its operative position according to the position of said member heightwise of said tools.

59. In a machine of the class described having operating tools for performing a shoemaking operation upon shoes on lasts of a series of sizes in which the last dimensions vary according to a constant gradient, means for presenting a shoe on a last to said tools by advancing the shoe lengthwise thereof into operative relation to said tools, said operating tools being mounted for adjustment laterally of the shoe to accommodate shoes of different sizes, means for registering the height of the heel part of the shoe and last, and mechanism cooperating with said registering means for adjusting said operating tools laterally of the shoe in accordance with said gradient.

60. In a machine of the class described having operating tools for performing a shoemaking operation upon shoes on lasts of a series of sizes in which the last dimensions vary according to the same gradient, means for presenting a shoe to said tools in operative relation thereto by advancing the last in two different directions successively toward said tools, an abutment associated with said tools for limiting the second advancing movement of the shoe toward said tools, means operated in response to the first advancing movement of the shoe for registering the size of the shoe with reference to one dimension of the shoe and last, mechanism cooperating with said registering means for adjusting said tools with respect to a second dimension of the last, and stop means for limiting the first advancing movement of the shoe toward the tools, said stop means comprising cooperating stops one of which is positioned upon the engagement of the shoe with said abutment according to the said one dimension of the shoe and last.

61. In a machine of the class described having operating tools for performing a shoemaking operation upon shoes on lasts of a series of sizes in which the last dimensions vary according to the same gradient, means for presenting a shoe in operative relation to said tools by advancing the last lengthwise and heightwise thereof successively toward said tools, means for registering the size of the shoe by reference to one dimension of the shoe and last, said operating tools being mounted for adjustment to accommodate a second dimension of the shoe, mechanism cooperating with said registering means for adjusting said tools with reference to said second dimension in response to the advancing movement of the shoe lengthwise of the last, and stop means comprising a member mounted for adjustment in response to heightwise advancing movement of the last for limiting its said lengthwise movement in accordance with said one dimension.

62. In a machine of the class described having operating tools for performing a shoemaking operation upon shoes on lasts of a series of sizes in which the last dimensions vary according to the same gradient, mechanism for adjusting said tools to accommodate one dimension of a shoe presented thereto, supporting means for the last mounted for movement to carry the shoe into operative relation to said tools, said supporting means comprising members by which the shoe and last are engaged at the extremities of a second dimension, one of said members being mounted for movement into a size registering position determined by said second dimension, and connections operated by said last-mentioned member for driving said mechanism whereby said tools are adjusted with respect to said first-mentioned dimension in accordance with said second dimension.

63. In a machine of the class described having operating tools for performing a shoemaking operation upon shoes on a series of lasts the dimensions of which vary according to a constant gradient, mechanism for adjusting said tools to accommodate one dimension of a shoe presented thereto, supporting means for the last mounted for movement to carry the shoe thereon into operative relation to said tools, said supporting means comprising members by which the shoe and last are engaged at the opposite extremities of a second dimension, means for operating one of said members to displace the shoe and last into a predetermined position whereby the other of said members is positioned by the last in a size registering position determined by said second dimension, and connections driven by said last-mentioned member for operating said mechanism to adjust said tools with respect to said one dimension in accordance with said second dimension.

64. In a machine of the class described having operating tools for performing a shoemaking operation upon shoes on lasts of a series of sizes in which the last dimensions vary according to the same gradient, means for presenting a shoe on a last to said tools by advancing the shoe in the direction of one of said dimensions into operative relation to said tools, an abutment associated with said tools for positioning the shoe relatively thereto by engagement with the shoe opposite to one extremity of a second dimension of the last, said means comprising a yieldingly mounted support for urging the last by engagement therewith at the other extremity of said second dimension to hold the shoe against said abutment whereby said support is positioned according to said second dimension, and means for variably limiting the advancing movement of said presenting means comprising cooperating stops one of which has a stop surface disposed on a slope corresponding to said gradient, one of said stops also being mounted for movement with said support whereby the operative position of the shoe along the direction of said one dimension is determined according to said second dimension and said gradient.

65. In a machine of the class described having operating tools for performing a shoemaking operation upon shoes on lasts of a series of sizes in which the last dimensions vary according to the same gradient, means for presenting a shoe on a last to said tools by advancing the shoe in the direction of one of said dimensions into operative relation to said tools, an abutment associated with said tools for positioning the shoe relatively thereto by engagement with the shoe opposite to one extremity of a second dimension of the last, said means comprising a yieldingly mounted support for urging the last by engagement therewith at the other extremity of said second dimension to hold the shoe against said abutment whereby said support is spaced from said abutment by said second dimension, and means for variably limiting the advancing movement of said presenting means comprising a fixed stop and cooperating therewith a second stop mounted upon said support, one of said stops having a stop surface disposed on a slope corresponding to said gradient whereby the shoe is positioned in the direction of said one dimension according to said second dimension and said gradient.

66. In a machine of the class described having operating tools for performing a shoemaking operation upon shoes on lasts of a series of sizes in which the length and height of the lasts vary according to the same gradient, means for presenting a shoe on a last to said tools by advancing the shoe lengthwise thereof into operative relation to said tools, an abutment associated with said tools for positioning the shoe heightwise thereof by engagement with the bottom of the heel part of the shoe, said means comprising a yieldingly mounted support for urging the last by engagement with the top of its heel part to hold the shoe bottom against said abutment whereby said support is positioned according to the height of the heel part, and means for variably limiting the advancing movement of said presenting means comprising cooperating stops one of which has a stop surface disposed on a slope corresponding to said gradient, one of said stops also being mounted for movement with said support heightwise of the last whereby the operative position of the shoe lengthwise thereof is controlled by the height of the heel part and said gradient.

67. In a machine of the class described having operating tools for performing a shoemaking operation upon shoes on lasts of a series of sizes in which the length and height of the lasts vary according to the same gradient, means for presenting a shoe on a last to said tools by advancing the shoe lengthwise and heightwise thereof into operative relation to said tools, an abutment associated with said tools for positioning the shoe heightwise thereof with respect to said tools by engagement with the shoe bottom, said means comprising a yieldingly mounted support for urging the last by engagement with the top of its heel part to hold the shoe bottom against said abutment whereby said support is positioned according to the height of the heel part of the last, and means for variably limiting the advancing movement of said presenting means comprising a fixed stop and cooperating therewith a second stop mounted upon said support, one of said stops having a stepped stop surface disposed on a slope corresponding to said gradient, whereby the operative relation of the shoe with respect to said tools lengthwise of the last is determined in accordance with the height of the heel part and said gradient.

68. A shoemaking system comprising a shoemaking machine having operating tools for performing an operation upon a shoe on a last provided with positioning surfaces in a predetermined relation to the last, pallets having last holding means thereon cooperating with said positioning surfaces to locate a last in a predetermined position upon the pallet, and pallet handling apparatus comprising a pallet carrier mounted for movement in a predetermined path to advance the shoe into operative relation to the operating tools of said machine, means for positioning said pallet upon said carrier in a predetermined relation thereto, and means for variably limiting the advancing movement of said carrier according to the size of the last to cause said last holding means to be brought into the same relation to the tools as that between the positioning surfaces on the last and the shoe, when the shoe has been moved into its operative position in the machine.

69. In a shoemaking system comprising a shoemaking machine for performing an operation upon a shoe on a last having positioning surfaces thereon in a predetermined relation to the last, in combination, a conveyor having a transfer station opposite to said machine, a pallet movable upon said conveyor into and out of said transfer station, transfer mechanism with which said pallet is coupled upon its movement into said transfer station, and last holding means on said pallet cooperating with said positioning surfaces to locate the last in a predetermined position upon said pallet, said transfer mechanism being operable to present the pallet to said machine with the lasted shoe in a predetermined operative position with respect to the operating tools of said machine, the relation between the operating tools of the machine and said last holding means being the same as that between said last and its said positioning surfaces when said pallet has been positioned so as to bring the lasted shoe into its said operative position.

70. Mechanism for presenting to a shoe machine a shoe upon a last having positioning surfaces thereon in a predetermined relation to the last, said mechanism comprising, in combination, a conveyor having a transfer station, a pallet movable along said conveyor into and out of said transfer station, a carrier to which said pallet is coupled in a predetermined position upon movement of the pallet into said transfer station, means for moving said carrier away from said transfer station into a predetermined operative position thereby to present a lasted shoe on said pallet to the operating tools of said machine, and last holding means on said pallet comprising members arranged to cooperate with said positioning surfaces to locate the last in a predetermined position upon the pallet, the relation between said last and its said positioning surfaces being the same as that between the operating tools of the machine and said members when said carrier is in its operative position.

71. Mechanism for presenting to a shoe machine a shoe upon a last having positioning surfaces formed thereon in a predetermined relation to the last, said mechanism comprising, in combination, a conveyor having a transfer station, a pallet movable upon said conveyor into and out of said transfer station, a carrier to which the pallet is coupled upon movement of the pallet into said transfer station, said carrier being movable from said transfer station into a predetermined operative relation to said machine, last holding means mounted for movement upon said pallet into engagement with said positioning surfaces to locate the last upon the pallet in a predetermined position, and connections operated in response to movement of said pallet onto said carrier for moving said last holding means into engagement with said positioning surfaces whereby a predetermined relation of the last with respect to the shoe machine is effected.

72. Mechanism for presenting to a shoe machine a shoe upon a last having sets of positioning surfaces thereon in different relations to the last, said mechanism comprising, in combination, pallets for holding lasts, a conveyor having a transfer station into and out of which pallets are movable, a carrier with which a pallet is coupled as it moves into said transfer station, said carrier being movable from said transfer station into a predetermined operative relation to said machine, last holding means comprising a positioning member mounted on said pallet for movement between said sets of positioning surfaces, and connections operated by movement of said pallet onto said carrier for moving said positioning member into operative relation to one set of said positioning surfaces whereby a predetermined relation of the last with respect to the pallet, carrier and shoe machine is effected.

73. Mechanism for presenting to a shoe machine a shoe upon a last having two sets of positioning surfaces thereon which are spaced from each other lengthwise of the last and which are offset from each other laterally of the last, said mechanism comprising, in combination, pallets for holding the lasts, a conveyor having a transfer station, a carrier with which a pallet is coupled as it moves into said transfer station, said carrier being movable from said transfer station in a predetermined path to carry a shoe into operative relation to said machine, last holding means comprising a positioning member mounted upon said pallet to slide between two operative positions in each of which said member cooperates with one set of said positioning surfaces to locate the last upon the pallet, and connections operated in response to movement of the pallet onto said carrier for moving said positioning member into and holding it in one of its operating positions whereby a predetermined relation of the last with respect to the pallet, carrier and shoe machine is effected.

74. Mechanism for presenting to a shoe machine a shoe upon a last having two sets of positioning surfaces formed upon its heel part, one set being spaced longitudinally and offset laterally from the other, said mechanism comprising, in combination, pallets for holding the lasts, each pallet comprising a pin and a last positioning member mounted for movement upon said pallet into cooperative relation with either of said sets of positioning surfaces to orient the last upon the pallet, a conveyor having a transfer station into and out of which said pallets are movable upon said conveyor, a carrier with which a pallet is coupled as it moves into said transfer station, means for moving said carrier through a predetermined path to transfer the shoe associated therewith into operative relation to said machine, and cam controlled means operated in response to movement of said pallet onto said carrier for moving said positioning member into operative relation to one set of said positioning surfaces whereby the last and shoe are positioned in a predetermined relation to the pallet, carrier and shoe machine.

75. A shoemaking system comprising a machine for performing automatically an operation upon a shoe carried by a last, said machine having operating tools which are adjustable to accommodate different sizes of shoes, work handling apparatus for automatically presenting shoes to said machine, said apparatus comprising a conveyor along which the shoes are carried from a loading station into and out of a transfer station and are returned to said loading station, transfer mechanism for carrying shoes from said transfer station into operative relation to said machine and back to said transfer station, means for registering the size of each shoe during its movement from said transfer station into said machine, means cooperating with said registering means for setting said tools according to the size of the shoe and means for limiting the movement of said transfer mechanism toward said machine according to the size of the shoe.

76. A shoemaking system comprising a machine for performing automatically an operation upon a shoe carried by a last, said machine having operating tools which are adjustable to accommodate different sizes of shoes, work handling apparatus for automatically presenting shoes to said machine, said apparatus comprising a conveyor having a transfer station opposite to said machine and transfer mechanism for carrying shoes from said transfer station into operative relation to said tools and back to said transfer station, means for registering the size of a shoe during its movement from said transfer station toward said machine, means cooperating with said registering means for setting said tools according to the size of the shoe, control means for actuating said transfer mechanism to present the shoe to said machine, control means for initiating a cycle of operation of said machine upon the presentation of the shoe thereto and control means operated by said machine at the end of said cycle for actuating said mechanism to return the shoe thereon to said transfer station.

77. A shoemaking system comprising a machine for performing automatically an operation upon a shoe carried by a last having positioning surfaces thereon in a predetermined relation to the last, said machine having operating tools which are adjustable to accommodate shoes of different sizes, work handling apparatus for automatically presenting to said machine shoes carried by pallets, said apparatus comprising a conveyor along which the pallets are driven from a loading station into and out of the transfer station and back to said loading station, said pallets having members cooperating with said positioning surfaces to locate the lasts in a predetermined position upon the pallets, transfer mechanism for receiving each pallet at said transfer station and movable through a predetermined path to present the shoe to said operating tools, registering mechanism operated in response to movement of said transfer mechanism toward said machine for registering the size of a shoe, means cooperating with said registering mechanism for setting said tools according to the size of the shoe, control means operated upon the arrival of each pallet at said transfer station for actuating said transfer mechanism to present a shoe to said machine, control means for initiating a cycle of operation of said machine upon the presentation of the shoe thereto, and control means operated by said machine at the end of said cycle for actuating said transfer mechanism to return the shoe to said transfer station.

78. In a machine of the class described having operating tools for performing a shoemaking operation upon a shoe on a last, said tools being adjustable to accommodate shoes of varying sizes, last supporting means mounted for movement toward said tools along a fixed path to advance the shoe into operative relation to said tools, size registering means mounted upon said last supporting means for movement into a position corresponding to the size of the last, and mechanism operated by said registering means in response to advancing movement of said last supporting means for adjusting said operating tools according to the size of the shoe.

79. In a machine of the class described having operating tools for performing a shoemaking operation upon a shoe on a last, said tools being adjustable to accommodate shoes of varying sizes, last supporting means mounted for movement toward said tools along a predetermined path to advance the shoe into operative relation to said tools, said last supporting means comprising means for registering the size of the shoe and last in response to said advancing movement, means for clamping said registering means in its size registering position, and mechanism operated by said registering means following the operation of said clamping means for adjusting said operating tools in response to movement of said last supporting means into operative relation to said tools.

80. In a machine of the class described having operating tools for performing a shoemaking operation upon a shoe on a last, said tools being adjustable to accommodate shoes of varying sizes, last supporting means mounted for movement toward said tools along a predetermined path to advance the shoe into operative relation to said tools, said means having mounted thereon means for registering the size of the shoe and last, means for clamping said registering means in its size registering position, means for operating said size registering means and said clamping means in succession in response to said advancing movement, and mechanism operated in response to said advancing movement after said clamping means has been operated for adjusting said operating tools according to the size of the shoe.

References Cited in the file of this patent

UNITED STATES PATENTS

| | | |
|---|---|---|
| 1,854,204 | Lawson | Apr. 19, 1932 |
| 2,139,403 | Cole | Dec. 6, 1938 |
| 2,151,038 | Lancaster | Mar. 21, 1939 |
| 2,572,011 | Cohen et al. | Oct. 23, 1951 |

FOREIGN PATENTS

| | | |
|---|---|---|
| 314,688 | Great Britain | July 4, 1929 |